US010594806B2

(12) United States Patent
Ishikawa et al.

(10) Patent No.: US 10,594,806 B2
(45) Date of Patent: Mar. 17, 2020

(54) MANAGEMENT OF MOBILE OBJECTS AND RESOURCES

(71) Applicant: INTERNATIONAL BUSINESS MACHINES CORPORATION, Armonk, NY (US)

(72) Inventors: Hiromi Ishikawa, Tokyo (JP); Atsushi Tsuchiya, Tokyo (JP); Gaku Yamamoto, Machida (JP)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 15/446,359

(22) Filed: Mar. 1, 2017

(65) Prior Publication Data

US 2017/0180491 A1 Jun. 22, 2017

Related U.S. Application Data

(63) Continuation-in-part of application No. 14/970,626, filed on Dec. 16, 2015, now abandoned.

(51) Int. Cl.
*G01C 21/34* (2006.01)
*H04L 29/08* (2006.01)
(Continued)

(52) U.S. Cl.
CPC .............. *H04L 67/18* (2013.01); *G01C 21/34* (2013.01); *G01C 21/3415* (2013.01);
(Continued)

(58) Field of Classification Search
CPC ........ G06Q 50/30; G07C 11/00; G01C 21/34; G08G 1/20
See application file for complete search history.

(56) References Cited

U.S. PATENT DOCUMENTS

| 5,504,683 A | 4/1996 | Gurmu et al. |
| 5,948,040 A | 9/1999 | Delorme et al. |

(Continued)

FOREIGN PATENT DOCUMENTS

| CN | 102147260 A | 8/2011 |
| CN | 102231231 A | 11/2011 |

(Continued)

OTHER PUBLICATIONS

Hyland, et al., Taxonomy of Shared Autonomous Vehicle Fleet Management Problems to Inform Future Transportation Mobility, Transportation Research Record: Journal of the Transportation Research Board, No. 2653, 2017, pp. 26-34.*

(Continued)

*Primary Examiner* — Daniel Vetter
(74) *Attorney, Agent, or Firm* — Erik K. Johnson

(57) ABSTRACT

Mobile objects and resources are managed by a system including a mobile object server operable to receive information from a plurality of mobile objects in a geographic space, and an event server in communication with the mobile object server. The event server is operable to receive, from the mobile object server, resource utilization information indicating a resource in the geographic space that each mobile object is scheduled to use, calculate a state of use of the resource based on a predicted arrival time of each mobile object at the resource, and send a recommendation for relaxing congestion of the resource.

20 Claims, 13 Drawing Sheets

(51) Int. Cl.
  *G08G 1/00* (2006.01)
  *G06Q 50/30* (2012.01)
  *G08G 1/01* (2006.01)
  *G08G 1/065* (2006.01)
  *G08G 1/0968* (2006.01)
  *G08G 1/14* (2006.01)
  *G08G 5/00* (2006.01)

(52) U.S. Cl.
  CPC ........... *G06Q 50/30* (2013.01); *G08G 1/0112* (2013.01); *G08G 1/0133* (2013.01); *G08G 1/0145* (2013.01); *G08G 1/065* (2013.01); *G08G 1/096822* (2013.01); *G08G 1/096844* (2013.01); *G08G 1/143* (2013.01); *G08G 1/148* (2013.01); *G08G 1/20* (2013.01); *G08G 5/0043* (2013.01); *G08G 5/0082* (2013.01); *H04L 67/12* (2013.01)

(56) References Cited

U.S. PATENT DOCUMENTS

| | | | |
|---|---|---|---|
| 6,028,550 A | 2/2000 | Froeberg et al. |
| 6,150,961 A | 11/2000 | Alewine et al. |
| 6,556,825 B1 | 4/2003 | Mansfield |
| 6,601,084 B1 | 7/2003 | Bhaskaran et al. |
| 7,049,979 B2 | 5/2006 | Dunning |
| 7,395,151 B2 | 7/2008 | O'Neill et al. |
| 7,447,588 B1 | 11/2008 | Xu et al. |
| 7,525,933 B1 | 4/2009 | Hall |
| 7,657,406 B2 | 2/2010 | Tolone et al. |
| 7,689,348 B2 | 3/2010 | Boss et al. |
| 7,710,421 B2 | 5/2010 | Muramatsu |
| 7,899,611 B2 | 3/2011 | Downs et al. |
| 7,979,172 B2 | 7/2011 | Breed |
| 8,000,887 B2 | 8/2011 | Nathan et al. |
| 8,064,378 B2 | 11/2011 | Karabinis |
| 8,195,436 B2 | 6/2012 | Tolone et al. |
| 8,374,777 B2 | 2/2013 | Reich |
| 8,396,652 B2 | 3/2013 | Nomura |
| 8,428,876 B2 | 4/2013 | Lee |
| 8,473,263 B2 | 6/2013 | Tolone et al. |
| 8,510,319 B2 | 8/2013 | Stevens |
| 8,599,848 B2 | 12/2013 | Janneteau et al. |
| 8,620,510 B1 | 12/2013 | Meuth et al. |
| 8,768,012 B2 | 7/2014 | Satoh |
| 8,791,838 B2 | 7/2014 | Scofield et al. |
| 8,799,246 B2 | 8/2014 | Nomura et al. |
| 8,818,608 B2 | 8/2014 | Cullinane et al. |
| 8,850,013 B2 | 9/2014 | Waldman et al. |
| 8,862,146 B2 | 10/2014 | Shatsky et al. |
| 8,930,269 B2 | 1/2015 | He et al. |
| 8,988,252 B2 | 3/2015 | Scholl et al. |
| 9,113,293 B1 | 8/2015 | Raybum et al. |
| 9,210,589 B2 | 12/2015 | Panta et al. |
| 9,237,417 B2 | 1/2016 | Marshall et al. |
| 9,460,616 B1 | 10/2016 | Miyahira et al. |
| 9,467,839 B1 | 10/2016 | Nishimura et al. |
| 9,497,590 B1 | 11/2016 | Gotoh et al. |
| 9,497,591 B1 | 11/2016 | Gotoh et al. |
| 9,513,134 B1 | 12/2016 | Ishikawa et al. |
| 9,538,327 B1 | 1/2017 | Gotoh et al. |
| 9,562,775 B2 | 2/2017 | Gotoh et al. |
| 9,578,093 B1 | 2/2017 | Gotoh et al. |
| 9,947,052 B1* | 4/2018 | Slusar .................. G08G 1/0129 |
| 10,156,848 B1* | 12/2018 | Konrardy ................ B60L 58/12 |
| 2004/0172316 A1 | 9/2004 | Hale et al. |
| 2004/0230370 A1 | 11/2004 | Tzamaloukas |
| 2005/0065711 A1 | 3/2005 | Dahlgren et al. |
| 2007/0109303 A1 | 5/2007 | Muramatsu |
| 2007/0241932 A1 | 10/2007 | Otero et al. |
| 2008/0046134 A1 | 2/2008 | Bruce et al. |
| 2008/0270605 A1 | 10/2008 | Berstis et al. |
| 2009/0070024 A1 | 3/2009 | Burchard et al. |
| 2009/0248758 A1 | 10/2009 | Sawai et al. |
| 2009/0287405 A1 | 11/2009 | Liu et al. |
| 2009/0311986 A1 | 12/2009 | Bose et al. |
| 2009/0327918 A1 | 12/2009 | Aaron et al. |
| 2010/0036595 A1 | 2/2010 | Coy et al. |
| 2010/0097208 A1* | 4/2010 | Rosing ................ G06Q 10/087 340/539.13 |
| 2010/0188265 A1 | 7/2010 | Hill et al. |
| 2010/0199213 A1 | 8/2010 | Suzuki |
| 2011/0037619 A1 | 2/2011 | Ginsberg et al. |
| 2011/0103302 A1 | 5/2011 | Hall |
| 2011/0205040 A1 | 8/2011 | Van Wiemeersch et al. |
| 2011/0276692 A1 | 11/2011 | Waldman et al. |
| 2012/0092187 A1 | 4/2012 | Scholl et al. |
| 2012/0291049 A1 | 11/2012 | Park et al. |
| 2013/0006925 A1 | 1/2013 | Sawai et al. |
| 2013/0099941 A1 | 4/2013 | Jana et al. |
| 2013/0204524 A1 | 8/2013 | Fryer et al. |
| 2013/0214939 A1 | 8/2013 | Washlow et al. |
| 2013/0244564 A1 | 9/2013 | Hall |
| 2013/0321397 A1 | 12/2013 | Chen et al. |
| 2014/0025432 A1 | 1/2014 | Thomassen et al. |
| 2014/0120953 A1 | 5/2014 | Ingram et al. |
| 2014/0136099 A1 | 5/2014 | Choi et al. |
| 2014/0180773 A1 | 6/2014 | Zafiroglu et al. |
| 2014/0191858 A1 | 7/2014 | Morgan et al. |
| 2014/0195214 A1 | 7/2014 | Kozloski et al. |
| 2014/0236414 A1 | 8/2014 | Droz et al. |
| 2014/0248899 A1 | 9/2014 | Emadzadeh et al. |
| 2014/0278026 A1 | 9/2014 | Taylor |
| 2014/0278029 A1 | 9/2014 | Tonguz et al. |
| 2014/0289267 A1 | 9/2014 | Felix et al. |
| 2014/0370842 A1 | 12/2014 | Abtin et al. |
| 2014/0378090 A1 | 12/2014 | Hall |
| 2015/0039391 A1 | 2/2015 | Hershkovitz et al. |
| 2015/0051822 A1 | 2/2015 | Joglekar |
| 2015/0066284 A1 | 3/2015 | Yopp |
| 2015/0120083 A1 | 4/2015 | Gurovich et al. |
| 2015/0149019 A1 | 5/2015 | Pilutti et al. |
| 2015/0179177 A1 | 6/2015 | Morgan et al. |
| 2016/0265923 A1* | 9/2016 | Fukushima ............. G01C 21/34 |
| 2016/0370185 A1 | 12/2016 | Gotoh et al. |
| 2016/0370190 A1 | 12/2016 | Gotoh et al. |
| 2016/0370195 A1 | 12/2016 | Gotoh et al. |
| 2016/0370196 A1 | 12/2016 | Gotoh et al. |
| 2016/0371120 A1 | 12/2016 | Gotoh et al. |
| 2016/0371281 A1 | 12/2016 | Gotoh et al. |
| 2016/0371282 A1 | 12/2016 | Gotoh et al. |
| 2016/0371299 A1 | 12/2016 | Gotoh et al. |
| 2016/0371323 A1 | 12/2016 | Gotoh et al. |
| 2016/0371326 A1 | 12/2016 | Gotoh et al. |
| 2016/0371864 A1 | 12/2016 | Gotoh et al. |
| 2016/0371975 A1 | 12/2016 | Yamamoto |
| 2016/0371976 A1 | 12/2016 | Yamamoto |
| 2016/0373524 A1 | 12/2016 | Gotoh et al. |
| 2016/0373896 A1 | 12/2016 | Yamamoto |
| 2017/0010111 A1 | 1/2017 | Gotoh et al. |
| 2017/0010112 A1 | 1/2017 | Gotoh et al. |
| 2017/0012812 A1 | 1/2017 | Gotoh et al. |
| 2017/0169366 A1* | 6/2017 | Klein .................. G06Q 10/025 |
| 2017/0176212 A1 | 6/2017 | Gotoh et al. |
| 2017/0192437 A1* | 7/2017 | Bier ..................... G05D 1/0038 |
| 2017/0213455 A1 | 7/2017 | Yamamoto |
| 2017/0272927 A1 | 9/2017 | Nishimura et al. |
| 2018/0059687 A1* | 3/2018 | Hayes ................ G01C 21/3415 |

FOREIGN PATENT DOCUMENTS

| | | |
|---|---|---|
| CN | 102997928 A | 3/2013 |
| CN | 103247176 A | 8/2013 |
| CN | 103258043 A | 8/2013 |
| CN | 103971529 A | 8/2014 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2007286706 A | 11/2007 |
| JP | 2008123197 A | 5/2008 |
| JP | 2008123325 A | 5/2008 |

(56) References Cited

FOREIGN PATENT DOCUMENTS

| | | |
|---|---|---|
| JP | 2008262418 A | 10/2008 |
| JP | 2008294921 A | 12/2008 |
| JP | 2009277078 A | 11/2009 |
| JP | 2011158339 A | 8/2011 |
| JP | 4985119 B2 | 7/2012 |
| JP | 2012150515 A | 8/2012 |
| JP | 2012155286 A | 8/2012 |
| JP | 2013045242 A | 3/2013 |
| JP | 2013101119 A | 5/2013 |
| JP | 2013101120 A | 5/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 1/2014 |
| WO | 2007140527 A1 | 12/2007 |
| WO | 2011081157 A1 | 7/2011 |
| WO | 2012167174 A1 | 12/2012 |
| WO | 2013167085 A2 | 11/2013 |
| WO | 2016203385 | 12/2016 |

OTHER PUBLICATIONS

Leontiadis, et al., On the Effectiveness of an Opportunistic Traffic Management System for Vehicular Networks, IEEE Transactions on Intelligent Transportation Systems, vol. 12, No. 4, Dec. 2011, pp. 1537-1548.*

Abrougui et al., "Efficient load balancing and QoS-based location aware service discovery protocol for vehicular ad hoc networks," EURASIP Journal on Wireless Communications and Networking, Mar. 2012, pp. 1-15, Springer.

Aulinas et al., "Local map update for large scale SLAM," Electronics Letters, Apr. 15, 2010, pp. 1-2, vol. 46, No. 8.

Dangel et al., "Can Road Traffic Volume Information Improve Partitioning for Distributed SUMO?," Modeling Mobility with Open Data, Lecture Notes in Mobility, 2015, pp. 61-74, Springer International Publishing.

DRM, "Local Dynamic Map," DRM Research Seminar, Jun. 30, 2010., pp. 1-72, Japan Digital Road Map Association.

Hong et al., "A grid-based node split algorithm for managing current location data of moving objects," The Journal of Supercomputing, Dec. 2007, pp. 321-337, vol. 42, Issue 3, Springer.

Hsu et al., "Automatic Traffic Monitoring Method Based on Cellular Model," Fifth International Conference on Intelligent Information Hiding and Multimedia Signal Processing, 2009, pp. 640-643, IEEE Computer Society.

Ihm et al., "Advanced Spatial Data Management for Enterprise Applications," An Oracle White Paper, Aug. 2010, pp. 1-16, Oracle Spatial 11g.

OpenStreetMap, "QuadTiles," OpenStreetMap Wiki, Last Modified on Mar. 3, 2014, pp. 1-10, http://wiki.openstreetmap.org/wiki/QuadTiles, Accessed on Jun. 15, 2015.

Ortelli, "Server-side clustering of geo-points on a map using Elasticsearch," Trifork Blog, Aug. 1, 2013, pp. 1-14, http://blog.trifork.com/2013/08/01/server-side-clustering-of-geo-points-on-a-map-using-elasticsearch/, Accessed on Jun. 15, 2015.

Pawlowski et al., "Applying Event Stream Processing on Traffic Problem Detection," Progress in Artificial Intelligence (EPAI), 2009, pp. 27-38, LNAI vol. 5816, Springer-Verlag Berlin Heidelberg.

Schade, "Sharing Data by Means of a Local Dynamic Map," Understanding the Standards for Cooperative ITS, Feb. 6, 2014, pp. 1-10, MINES ParisTech, Transportation Sustainability Environment Consulting.

Suzumura et al., "X10-based Massive Parallel Large-Scale Traffic Flow Simulation," ProVISION, Winter 2012, pp. 74-79, No. 72, IBM Professionals' Papers.

Y et al., "A Complex Event Processing System Approach to Real Time Road Traffic Event Detection," Journal of Convergence Information Technology (JCIT), Oct. 2013, pp. 142-148, vol. 8, No. 15.

Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, pp. 392-398, IEEE, The Hague, The Netherlands.

Miyahira et al., "Management of Mobile Objects and Service Platform for Mobile Objects," Application and Drawings, Filed on Jul. 14, 2016, pp. 1-68, U.S. Appl. No. 15/210,178.

Miyahira et al., "Management of Mobile Objects and Service Platform for Mobile Objects," Application and Drawings, Filed on Jul. 14, 2016, pp. 1-68, U.S. Appl. No. 15/210,207.

Nishimura et al., "Management of Dynamic Events and Moving Objects," Application and Drawings, Filed on Sep. 1, 2016, pp. 1-91, U.S. Appl. No. 15/254,183.

Gove et al., "NetVisia: Heat Map & Matrix Visualization of Dynamic Social Network Statistics & Content", 2011 IEEE International Conference on Privacy, Security, Risk, and Trust, and IEEE International Conference on Social Computing, Oct. 9-11, 2011, pp. 19-26.

Ishikawa et al., "Management of Mobile Objects and Resources," Application and Drawings, Filed on Dec. 16, 2015, pp. 1-52, U.S. Appl. No. 14/970,626.

Gotoh et al., "Management of Mobile Objects," Application and Drawings, Filed on Dec. 16, 2015, pp. 1-65, U.S. Appl. No. 14/970,631.

Ishikawa et al., "Management of Mobile Objects," Application and Drawings, Filed on Dec. 16, 2015, pp. 1-78, U.S. Appl. No. 14/970,643.

IEEE, "Server—Definition," IEEE 100: The Authoritative Dictionary of IEEE Standards Terms, 2000, pp. 1031, Seventh Edition.

IEEE, "System—Definition," IEEE 100: The Authoritative Dictionary of IEEE Standards Terms, 2000, pp. 1143-1144, Seventh Edition.

IBM, "List of IBM Patents or Patent Applications Treated as Related (Appendix P)," Mar. 1, 2017, p. 1-2.

IBM, "List of IBM Patents or Patent Applications Treated as Related (Appendix P)," Jun. 18, 2018, p. 1-2.

Pending U.S. Appl. No. 15/977,314, filed May 11, 2018, entitled: "Geographic Space Management", pp. 1-98.

IBM, "List of IBM Patents or Patent Applications Treated as Related (Appendix P)," Feb. 20, 2018, p. 1-2.

* cited by examiner

| MO ID | Current Location | Future Location | Resource Utilization Info | Recommended Resource |
|---|---|---|---|---|
| MO 0001 | ... | ... | Re xxxx | Re xxxx |
| MO 0002 | ... | ... | Re yyyy | Re yyxx |
| ⋮ | ⋮ | ⋮ | ⋮ | ⋮ |
| MO 1000 | ... | ... | Re zzzz | Re zzzz |

Mobile Object List

FIG.7

| Resource ID | Type | Location | Basic Info | Capacity |
|---|---|---|---|---|
| Re 0001 | Parking | ... | 30 cars, 5$/H | 10/30 |
| Re 0002 | Parking | ... | 5 cars, 4$/H | 4/5 |
| ▪▪▪▪▪ | ▪▪▪▪▪ | ▪▪▪▪▪ | ▪▪▪▪▪ | ▪▪▪▪▪ |
| Re 1000 | Route | ... | 3Lines, Lim:50M/H Ave:45M/H | 200/300 Incoming:20/min Outflowing:15/min |

Resource List

FIG. 8

MANAGEMENT OF MOBILE OBJECTS AND RESOURCES

CROSS REFERENCE TO RELATED APPLICATION

This application is a Continuation-in-Part application of pending U.S. patent application Ser. No. 14/970,626 filed Dec. 16, 2015.

BACKGROUND

The present invention relates to a system for managing mobile objects and resources in a geographic space.

A large number of automobiles and events in a geographic space can be managed by a system. Such a system may also manage resources, such as tourist spots, routes, and parking areas. Because resources can be shared by automobiles, a single resource may become flooded with a great number of automobiles. Therefore, the system may be required to allocate the resources among the automobiles to alleviate the congestion.

SUMMARY

Therefore, it is an object of an aspect of the innovations herein to provide a system including a mobile object server operable to receive information from a plurality of mobile objects in a geographic space, and an event server in communication with the mobile object server. The event server is operable to receive, from the mobile object server, resource utilization information indicating a resource in the geographic space that each mobile object is scheduled to use, calculate a state of use of the resource based on a predicted arrival time of each mobile object at the resource, and send a recommendation for relaxing congestion of the resource. The first aspect may enable the system to reduce congestion by recommending alternative resources to mobile objects.

A second aspect of the invention may include a computer-implemented method performed by the system of the first aspect. A third aspect of the invention may include a computer program product comprising a non-transitory computer readable storage medium having program instructions embodied therewith, the program instructions executable by a computer to cause the computer to perform the method of the second aspect.

The summary clause does not necessarily describe all of the features of the embodiments of the present invention. The present invention may also be a sub-combination of the features described above. The above and other features and advantages of the present invention will become more apparent from the following description of the embodiments, taken in conjunction with the accompanying drawings.

BRIEF DESCRIPTION OF THE SEVERAL VIEWS OF THE DRAWINGS

FIG. 7 shows the mobile object list according to an embodiment of the present invention.

FIG. 8 shows the resource list according to an embodiment of the present invention.

DETAILED DESCRIPTION

Hereinafter, example embodiments of the present invention will be described. These example embodiments shall not limit the claims, and not all of the combinations of the features described in the embodiments are necessarily essential to the invention.

Figure 1:
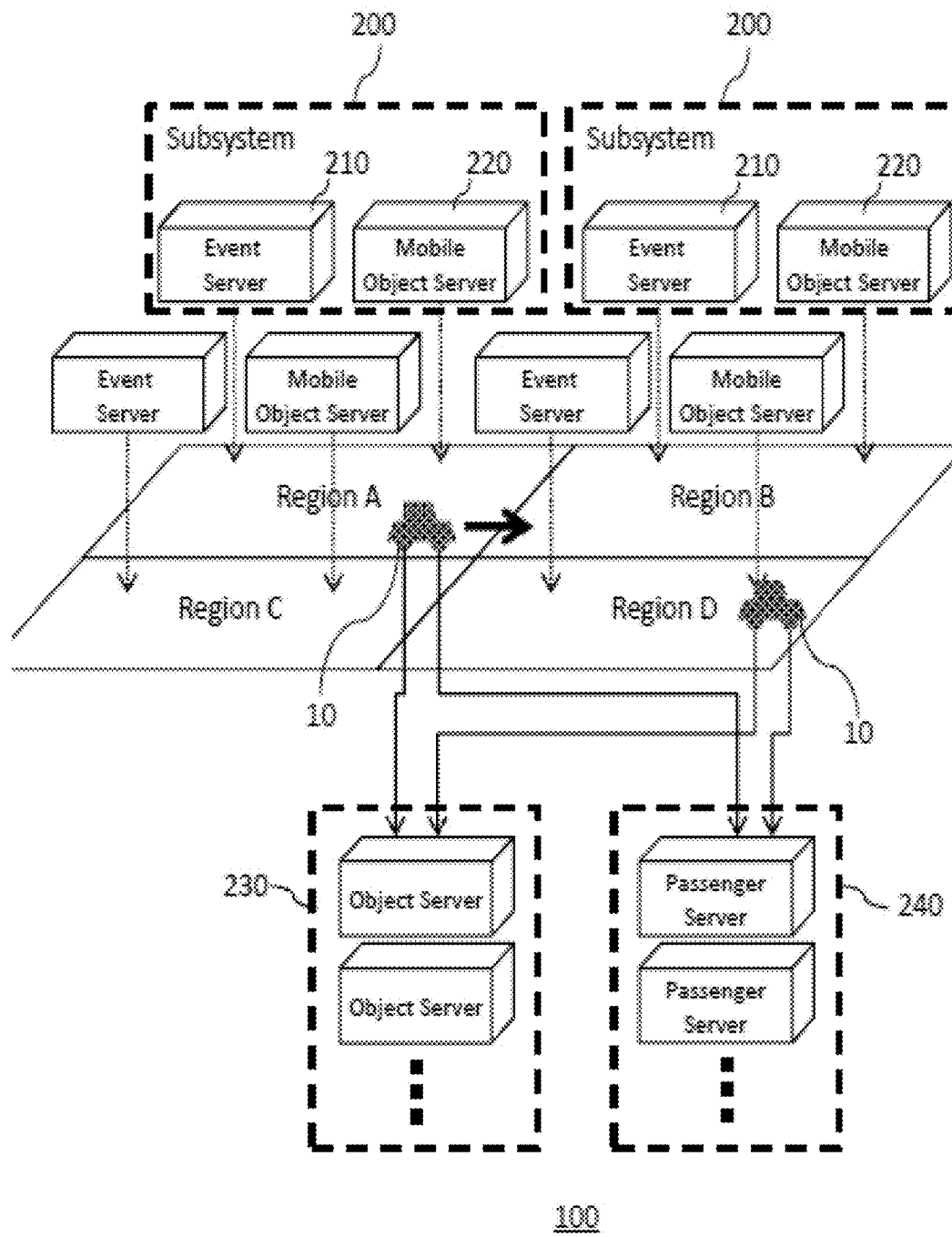
FIG. 1 shows a system 100 and a map area corresponding to a geographic space managed by the system 100 according to an embodiment of the present invention.

FIG. 1 shows a system 100 and a map area corresponding to a geographic space managed by the system 100, according to an embodiment of the present invention. The system 100 manages a geographic space that includes routes on which a mobile object 10 moves. The system 100 is operable to divide the geographic space into a plurality of regions and manage these regions. A mobile object 10 may move on routes including land routes, sea routes, and/or air routes, for example. The geographic space may be land, sea, or air space that includes the routes on which the mobile object travels. The mobile objects 10 may be manned/unmanned automobiles, motorbikes, bicycles, humans having a digital device, airplanes, vessels, drones, or the like. In an embodiment, mobile objects may be autonomous or semi-autonomous vehicles or objects, which may be controlled or aided by the system 100. The system 100 may control, or assist in the control, of mobile objects 10 located throughout the geographic space by either commanding (i.e. manipulating controls) the mobile object 10 to follow the determined commands, or alternatively by transmitting recommendations that would be analyzed and performed in conjunction with software modules and control systems located on mobile object 10.

FIG. 1 shows an automobile as an example of the mobile object 10, which moves along roads as examples of land routes. The system 100 includes a plurality of subsystems 200 that respectively manage the plurality of regions. FIG. 1 shows an example in which the whole map area is divided into four regions from region A to region D, and four subsystems 200 respectively manage these four regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The event server 210 manages events occurring in each region of the geographic space. In this embodiment, the event server 210 of subsystem 200 assigned to region A may manage events in region A. The plurality of mobile object servers 220 respectively assigned to a plurality of regions in a geographic space manage the mobile objects 10 in each of the plurality of regions. In this embodiment, the mobile object server 220 assigned to region A may manage mobile objects 10 located in region A. The object server 230 manages information of the mobile objects 10 regardless of the location of the mobile objects 10. The passenger server 240 manages information of at least one passenger riding on the mobile objects 10.

Each of the subsystems 200 may be implemented on one or more servers. In one embodiment, each event server 210 and mobile object server 220 may be implemented on one server. In another embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may be each implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a mobile object 10 from the mobile object 10, and the mobile object server 220 managing the region that includes the acquired position of the mobile object 10 may manage the movement of this mobile object 10. The system 100 acquires information of events that have occurred to the mobile object 10 and/or on the road outside, and the event server 210 managing the region including the position where such an event has occurred may manage the state of the event.

This event may include information about accidents, obstructions, closure, limitation, status, or construction on the road, or information about the weather, temperature, buildings, shops, or parking lots near the road. In response to a setting or a request from the mobile object 10, the subsystem 200 may provide notification about the event information to the mobile object 10 that made the request. For example, if the mobile object 10 is moving on a route in a geographical area corresponding to region A, then the mobile object sever 220 managing region A provides this mobile object 10 with the notification about the event relating to the route.

Since the map area is divided into a plurality of regions, despite the mobile object 10 simply moving on a route, the region corresponding to the position of the mobile object 10 might change. FIG. 1 shows an example in which the mobile object 10 is driving on a road such that the position of the mobile object 10 moves from region A to region B. In this case, according to the movement of the mobile object 10, the system 100 may transfer the information concerning the mobile object 10 from the mobile object server 220 managing region A to the mobile object server 220 managing region B, and may also transfer the management of the mobile object 10 to the mobile object server 220 managing region B.

Figure 2:
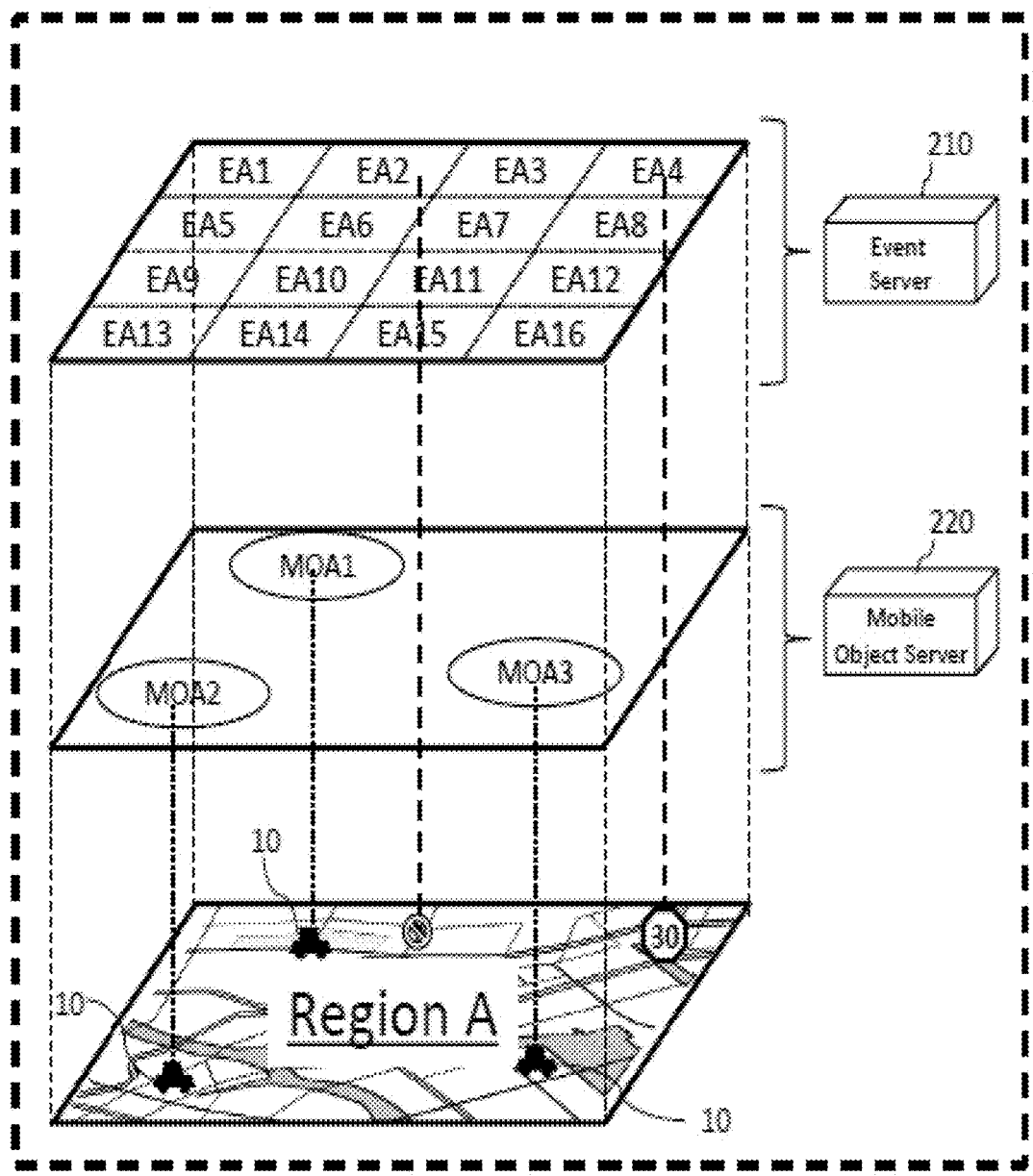
FIG. 2 shows a subsystem 200 and a map area corresponding to a region A managed by the subsystem 200 according to an embodiment of the present invention.

FIG. 2 shows a subsystem 200 and a map area corresponding to a region A managed by the subsystem 200, according to an embodiment of the present invention. The event server 210 manages at least one event agent, and executes each event agent to manage events on routes in a region assigned to the event server 210. An "agent" may be a software entity having specific data, and may operable to receive a message (e.g. command), and return a response message. Each region of the plurality of regions of geographic space includes at least a portion of one area of the plurality of areas. In this embodiment, the region assigned to the event server 210 is the same as the region assigned to the mobile object server 220. However, in other embodiments, these regions may be different.

In the embodiment of FIG. 2, the region A, which is the region assigned to the event server 210, is divided into 16 areas and each area is assigned to one of the event agents EA1-EA16. The event server 210 executes each of the event agents EA1-EA16 to manage events occurring on routes of each area of region A. For example, the event agent EA2 may manage a "closure" event on an area corresponding to EA2 on the map, and the event agent EA4 may manage a "speed limit" event on an area corresponding to EA4 as shown in FIG. 2.

The event server 210 also executes each of the event agents EA1-EA16 to manage resources located on each area of region A. The resource may be something that can be shared by a plurality of the mobile objects 10 and/or passengers thereof. For example, the resource may be a parking lot, a tourist spot, an institution, a shop, or a route on the geographic space. In one embodiment, the event agent EA2 may manage a plurality of parking lots on an area corresponding to EA2 on the map.

The plurality of mobile object servers 220 may include at least one mobile object server 220, each of which includes one or more mobile object agents assigned to each of the mobile objects 10. In the embodiment of FIG. 2, the mobile object server 220 includes three mobile object agents (MOAs) 1-3 assigned to three mobile objects 10 in the assigned region A. The mobile object server 220 executes each of the mobile object agents MOA1-MOA3 to manage the mobile objects 10 traveling on the region A.

Figure 3:
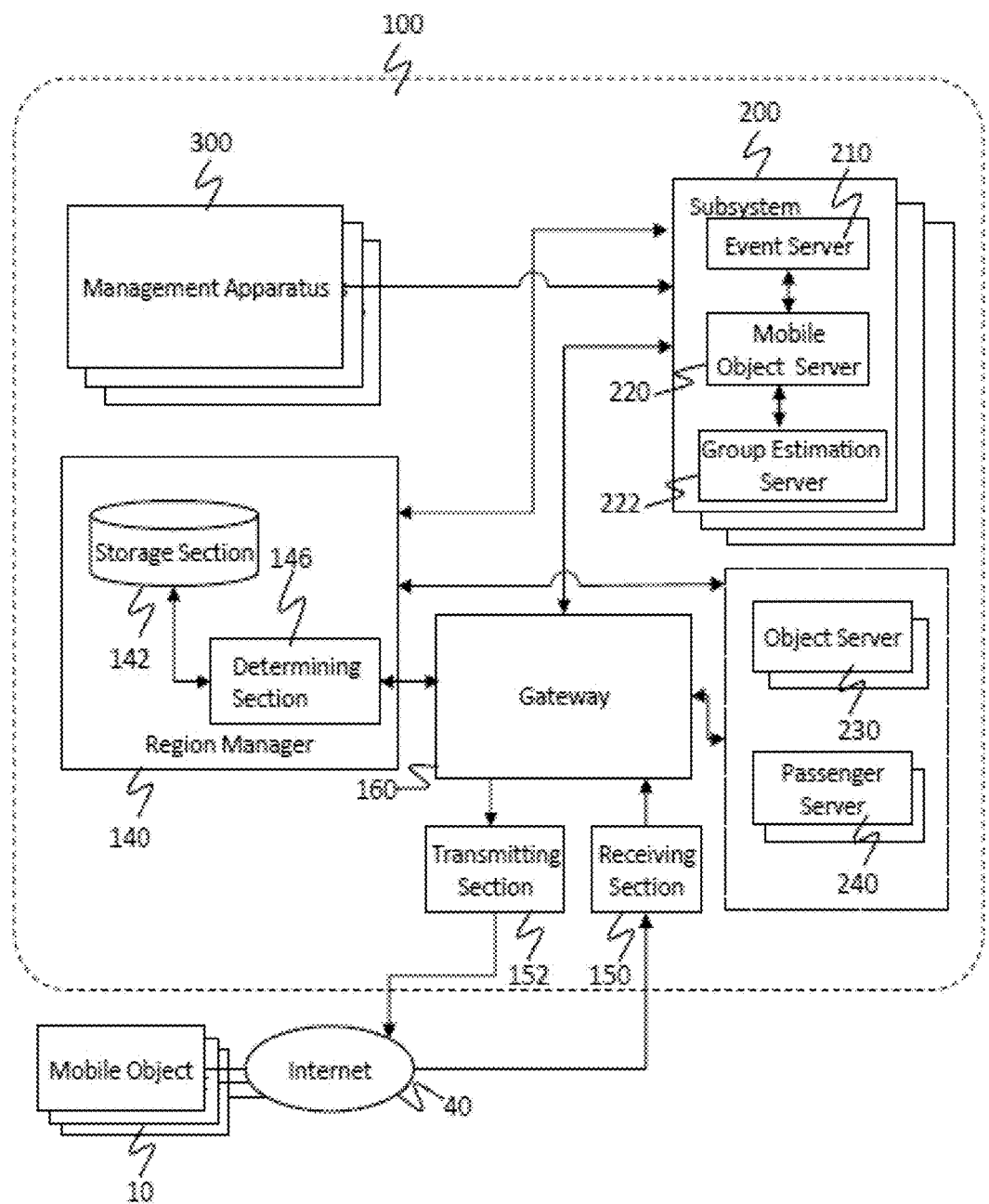
FIG. 3 shows a first exemplary configuration of the system 100 according to the present embodiment.

FIG. 3 shows an exemplary configuration of the system 100, according to an embodiment of the present invention. The system 100 may be operable to communicate with each of a plurality of mobile objects 10 to send and receive the information used to manage the mobile objects 10. The system 100 may be operable to acquire map data and/or information exchanged with the mobile objects 10, through the Internet, a subscriber network, a cellular network, or any desired combination of networks. The system 100 includes a region manager 140, a receiving section (i.e., module) 150, a transmitting section 152, a gateway apparatus 160, a plurality of subsystems 200, a plurality of object servers 230, a plurality of passenger servers 240, and a plurality of management apparatuses 300.

The region manager 140 may be operable to store information concerning the plurality of regions including borders between regions. The region manager 140 may be operable to specify the subsystem 200 managing the region that includes the position of the mobile object 10, in response to receiving the position of the mobile object 10. The region manager 140 may be implemented on one or more servers.

The storage section 142 may be operable to store information concerning the plurality of regions. The storage section 142 may store setting values or the like of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine one region from the plurality of regions (e.g., regions A-D of FIG. 1) in which each of the mobile objects 10 is located based on the position information of the mobile object 10 and geographic information of the plurality of regions. The determining section 146 may identify a route or position in the map area managed by the system 100 that corresponds to the position information of the mobile object 10.

The determining section 146 may store the position information of this mobile object 10 and/or information of the determined region in the storage section 142, in association with this mobile object 10. The determining section 146 may store a history of the position information of this mobile object 10 and/or a history of the determined mobile object server 220 in the storage section 142. The determining section 146 may be a circuit, a shared or dedicated computer readable medium storing computer readable program instructions executable by a shared or dedicated processor, etc.

The receiving section 150 may be operable to receive information transmitted from each of a plurality of mobile objects 10. Each mobile object 10 may transmit information at designated time intervals, and the receiving section 150 may sequentially receive this transmitted information. In this embodiment, the receiving section 150 may receive car probe data from each mobile object 10 as the information. The car probe data may include information detected by the mobile object 10, such as position information (e.g., a current location) of the mobile object 10. The car probe data may further include destination information of the mobile object 10.

In one embodiment, the position information may include longitude and latitude (and optionally altitude information) of the mobile object 10 in an absolute coordinate system. In another embodiment, the mobile object 10 may determine its location in the absolute coordinate system by using GPS, and the determining section 146 receiving the position information may determine a route on which the mobile object 10 exists and a specific location of the route at which the mobile object 10 exists based on the position information. Alternatively, the mobile object 10 may include such detailed position information in the car probe data.

The receiving section 150 may communicate with the plurality of mobile objects 10 and receive the car probe data of each mobile object 10, via the Internet 40. The receiving section 150 may receive the car probe data of the plurality of mobile objects 10 through wireless communication, a subscriber network, a cellular network, or any desired combination of networks.

The transmitting section 152 may be operable to transmit event information and resource information to each of the mobile objects 10 according to settings, for example. The transmitting section 152 may transmit resource information including a recommendation for relaxing congestion of the resource and event information concerning the route on which the mobile object 10 is expected to travel. The transmitting section 152 may communicate with the mobile objects 10 and transmit the information to the mobile objects 10 via the Internet 40. The transmitting section 152 may transmit the information to the mobile objects 10 through wireless communication, a subscriber network, a cellular network, or any desired combination of networks.

The gateway apparatus 160 may be operable to transfer communication between the plurality of subsystems 200 and the plurality of mobile objects 10. The gateway apparatus 160 may communicate with the receiving section 150 and receive the information transmitted by each mobile object 10.

The gateway apparatus 160 may communicate with the region manager 140 and demand the transfer destination for each piece of information received from the mobile objects 10, of the region manager 140. In response to this request, the gateway apparatus 160 may receive from the region manager 140 the information of the subsystem 200 managing the region on which the mobile object 10 exists.

The gateway apparatus 160 may communicate with each of the subsystems 200, and receive the information transmitted by each subsystem 200. The gateway apparatus 160 may transfer the information received from the mobile object 10 to the subsystem 200 that is to manage the mobile object 10. In other words, the gateway apparatus 160 may transfer the information received from each mobile object 10 to the subsystem 200 determined by the region manager 140.

The gateway apparatus 160 may communicate with the transmitting section 152 and supply the transmitting section 152 with the information received from each subsystem 200, such that this information is transferred to the mobile objects 10 designated for each subsystem 200.

The gateway apparatus 160 may include a plurality of gateway devices, and may quickly perform transfer between the plurality of subsystems 200 and the plurality of mobile objects 10. In this case, the receiving section 150 may function as a load balancer that supplies the information from the mobile objects 10, such that the load is spread among the plurality of gateways. The load balancer may sequentially supply information from the mobile objects 10 to the gateways having lighter loads. The gateway apparatus 160 may be a network that provides a connection between a plurality of networks using the same or different types of protocols.

A plurality of subsystems 200 may be operable to communicate with the region manager 140 and the gateway apparatus 160 and to respectively manage a plurality of regions in a geographic space. Each subsystem 200 is operable to manage mobile objects 10 that travel routes in its managed region and to manage events and resources in its managed region.

As described, each subsystem 200 may include an event server 210 and a mobile object server 220 in communication with the event server 210. The subsystem 200 may further include a group estimation server 222 in communication with the event server 210 and the mobile object server 220.

The event server 210 manages events occurring in its managed region with the plurality of the event agents. In one embodiment, the event server 210 may perform, through the event agent, (i) registration, update and/or deletion of events, (ii) registration, update and/or deletion of candidate events, and (iii) provision of event information. The event server 210 receives resource status information from the management apparatus 300, and manages resources in the managed region with the plurality of the event agents. The event server 210 may include a first computer-readable medium storing a first set of instructions that causes the event server to perform functions executed by the event agents.

The mobile object server 220 manages the plurality of the mobile objects 10 traveling in its managed region with the plurality of the mobile object agents. The mobile object server 220 receives information, such as the car probe data, from the plurality of mobile objects 10 with the plurality of the mobile object agents.

In one embodiment, the mobile object server 220 may perform, through the mobile object agent, (i) processing of the car probe data, (ii) update of information of the mobile object, and (iii) provision of information to the mobile object. For example, the mobile object server 220 may execute the mobile object agent to collect information of events and recommendable resources from at least one event server 210, and provide the mobile object 10 with information that assists the mobile object 10 with traveling in the geographic space. The mobile object server 220 includes a second computer-readable medium storing a second set of instructions that causes the mobile object server to perform functions executed by the mobile object agents.

The group estimation server 222 estimates a group of mobile objects 10 among the plurality of mobile objects 10 based on a location and a direction of each of at least two mobile objects 10 among the plurality of mobile objects 10. The group estimation server 222 provides the mobile object server 220 with its estimation.

A plurality of object servers 230 including at least one object server 230 may communicate with the gateway 160 and include an object agent (OA) containing information of the mobile object 10. An object agent may correspond to each mobile object 10 and contain information thereof. In one embodiment, the object agent may contain (i) information, by region, of which subsystem currently manages a mobile object agent of the mobile object 10, (ii) an identification (ID) of the mobile object 10, (iii) an ID of a passenger of the mobile object 10, and (iv) a characteristic of the mobile object 10 (e.g., model/version information, width, length, and/or height of the mobile object 10).

The object server 230 may perform, through the object agent, (i) provision and/or update of information of the mobile object 10, (ii) registration, update, and/or deletion of the ID of passenger riding on the mobile object 10, (iii) provision and/or update of the information of the region of the mobile object 10, and (iv) provision of information needed for generation of a new mobile object agent by the mobile object server 220.

At least one passenger server 240 of a plurality of passenger servers may communicate with the gateway 160, and include a passenger agent that contains information of at least one passenger. A passenger agent may correspond to each passenger or candidate passenger of mobile objects 10, and contain information thereof. In one embodiment, the object agent may contain an ID of a passenger and a characteristic of the passenger (e.g., information of age, gender, type, and the like of license of the passenger). The passenger server 240 may perform, through the passenger agent, provision, and/or update of information of the passengers.

The plurality of management apparatuses 300 may manage resources. In one embodiment, each management apparatus 300 monitors a current state of use of each resource, and sends the current state to the event server 210. In one embodiment, the management apparatus 300 may monitor open spaces, location of opens spaces, and fees of parking for its managed parking lots, may also monitor lanes, speed limits, and average speeds of its managed routes, and periodically sends such information to the event server 210.

As described above, the system 100 of the present embodiment may manage the mobile objects 10 by utilizing the mobile object agents in each mobile object server 220, and manage the events and resources by utilizing the event agent in each event server 210. According to the system 100 of the embodiment, the system 100 can separately manage information relating to the mobile objects 10, events and resources on the geographic map with a plurality of kinds of servers. Furthermore, each event server 210 may divide event management in one region among the plurality of event agents, and provide the mobile object agent with event/resource information, thereby improving the efficiency of event/resource management in the region (e.g., improving response time of event/resource search) and thus event notification and resource recommendation to the mobile objects 10. In addition, the system 100 can provide the mobile object agent with information of mobile object 10 by the object agent of the object server 230. The system 100 can also provide the mobile object agent with information of passengers of the mobile objects 10 by the passenger agent of the passenger server 240.

Figure 4:
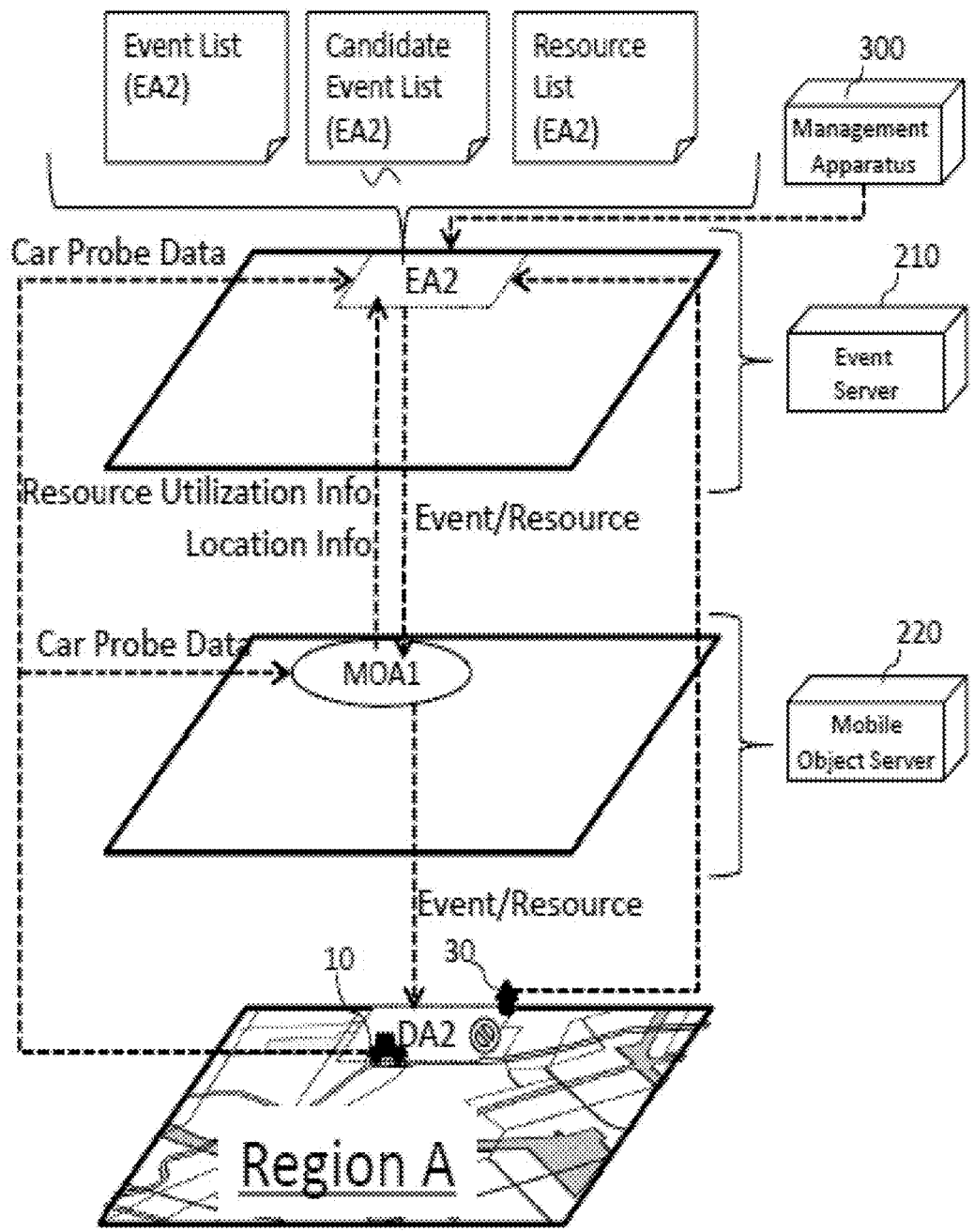
FIG. 4 shows management of events and resources by the event server 210 and the mobile object server 220 according to an embodiment of the present invention.

FIG. 4 shows management of events and resources by the event server 210 and the mobile object server 220, according to an embodiment of the present invention. In this embodiment, a mobile object 10 is traveling on a target route on region A and transmitting a car probe data, including the position information (e.g., a current location) of the mobile object 10 and a destination information of the mobile object 10 to the event server 210 and the mobile object server 220 managing region A via a gateway apparatus, such as the gateway apparatus 160.

The event server 210 manages event information through each event agent based on the car probe data from the mobile objects on region A. For example, each event agent may manage an event list (containing information of an event and an influence event for routes on the area managed by the event agent) and a candidate event list (containing information of candidates of an event for routes on the area managed by the event agent).

In the embodiment of FIG. 4, the event agent EA2 manages events of an area (indicated as "DA2" on the region A of FIG. 4) by the event list of the event agent EA2 and the candidate event list of the event agent EA2 based on car probe data from the mobile object 10 on the area DA2. For example, the event agent EA2 assigned to the area DA2 is executable to generate an event based on the information from the mobile object 10.

The event server 210 also manages resource information through each event agent with a resource list (containing resource status information indicating a current state of use of the resources).

The event agent EA2 receives, from the mobile object agent MOA1 executed by the mobile object server 220, a resource utilization information indicating a resource in the geographic space that each mobile object 10 is scheduled to use. The event agent EA2 also receives location information including a current location and a near-future location of the mobile object 10, from the mobile object agent MOA1. The event agent EA2 also receives resource status information indicating a current state of use of the resource from the management apparatus 300.

The event agent EA2 calculates a state of use of the resource based on a predicted arrival time of each of the plurality of mobile objects 10 at the resource. In one embodiment, the event agent EA2 calculates a future state of use of the resource further based on the current state of use of the resource received from the management apparatus 300. The event agent EA2 generates a recommendation for relaxing congestion of the resource based on the result of the calculation and sends the recommendation to the mobile object agent MOA1. The event agent EA2 also checks whether the at least one mobile object 10 is moving toward the alternative resource in response to sending the recommendation.

In one embodiment, each mobile object server 220 is operable to receive the car probe data from the mobile object 10 in the region A assigned to the mobile object server 220. The mobile object server 220 determines the target route where the mobile object 10 is located, based on the car probe data.

The mobile object server 220 executes the mobile object agent MOA1 for the mobile object 10 to provide the mobile object 10 with information that assists the mobile object 10 with traveling in the area DA2 based on the information of the event on the other route and the influence event of the target route. In the embodiment of FIG. 4, the mobile object agent MOA1 receives, from the event agent EA2, the event information of the route on which the mobile object 10 exists, and provides the mobile object 10 with the event information (e.g., information of closure).

The mobile object agent MOA1 may receive the current location and the destination information that may be included in the car probe data, from the mobile objects 10. The mobile object agent MOA1 may generate the resource utilization information of the mobile object 10 based on the destination information of the mobile object 10. The mobile object agent MOA1 may predict a near-future location of the mobile object 10 based on the current location received from each mobile object 10. The mobile object agent MOA1 may send the resource utilization information and location information including the current location and the near-future location of each mobile object 10 to the event agent EA2.

Furthermore, the mobile object agent MOA1 may receive the resource recommendation, which includes a recommendable resource, from the event agent EA2. The mobile object agent MOA1 may send the recommendation to the mobile object 10.

Figure 5:
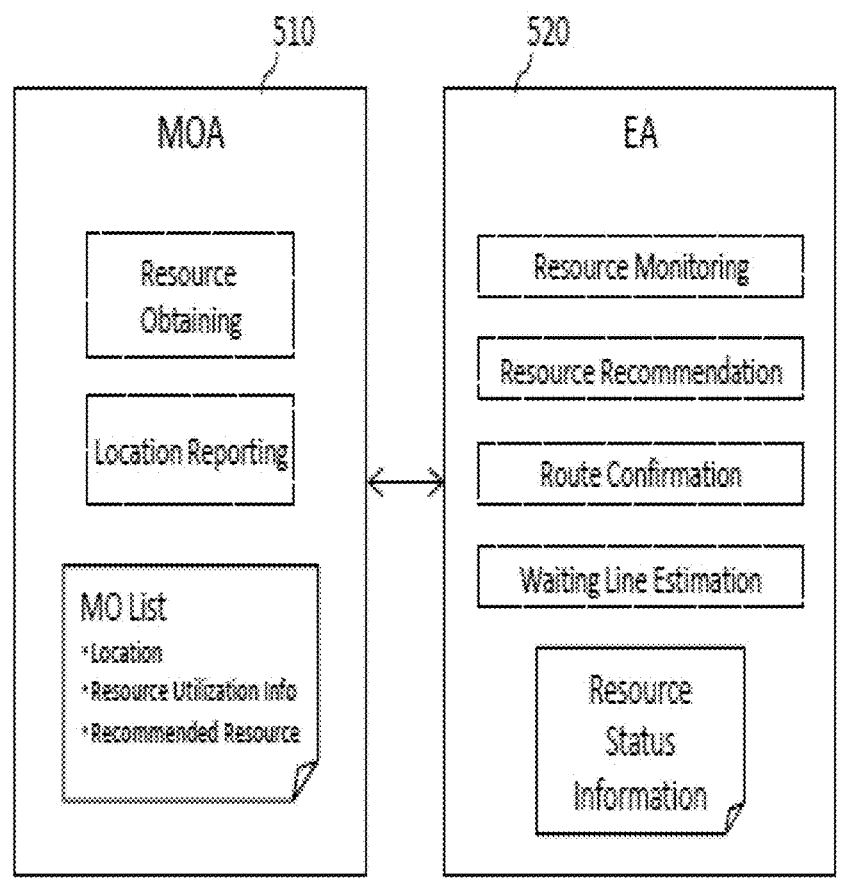
FIG. 5 shows functions of the mobile object agent and the event agent according to an embodiment of the present invention.

FIG. 5 shows functions of the mobile object agent and the event agent according to an embodiment of the present invention. As briefly explained, the mobile object agent may perform functions regarding resource management. For example, the mobile object agent 510 may perform a resource obtaining function and a location reporting function. The mobile object agent 510 may utilize a mobile object list (or "MO list") for performing these functions.

By the resource obtaining function, the mobile object agent 510 may obtain the resource recommendation from the event agent and send the resource recommendation to the mobile object 10. By the location reporting function, the mobile object agent 510 may send the current location and the near-future location of the mobile object 10 to the event agent.

The event agent 520 may also perform functions regarding resource management. For example, the event agent 520 may perform a resource monitoring function, a resource recommendation function, a route confirmation function, and a waiting line estimation function. The event agent 520 may utilize resource status information for performing these functions.

By the resource monitoring function, the event agent 520 may monitor its managed resources. In one embodiment, the event agent 520 may receive a current state of use of the resource from a management apparatus 300, and update the resource status information accordingly.

By the resource recommendation function, the event agent 520 may determine the recommendable resource for each mobile object 10, and send the resource recommendation to the mobile object agent 510. By the route confirmation function, the event agent 520 may confirm that the mobile object 10 is moving to the recommendable resource in response to sending the resource recommendation, and cause the mobile object agent 510 to update the recommended resource as necessary. By the waiting line estimation function, the event agent 520 may estimate a length of a waiting line of the mobile object agents that are seeking to use the resource.

Figure 6:
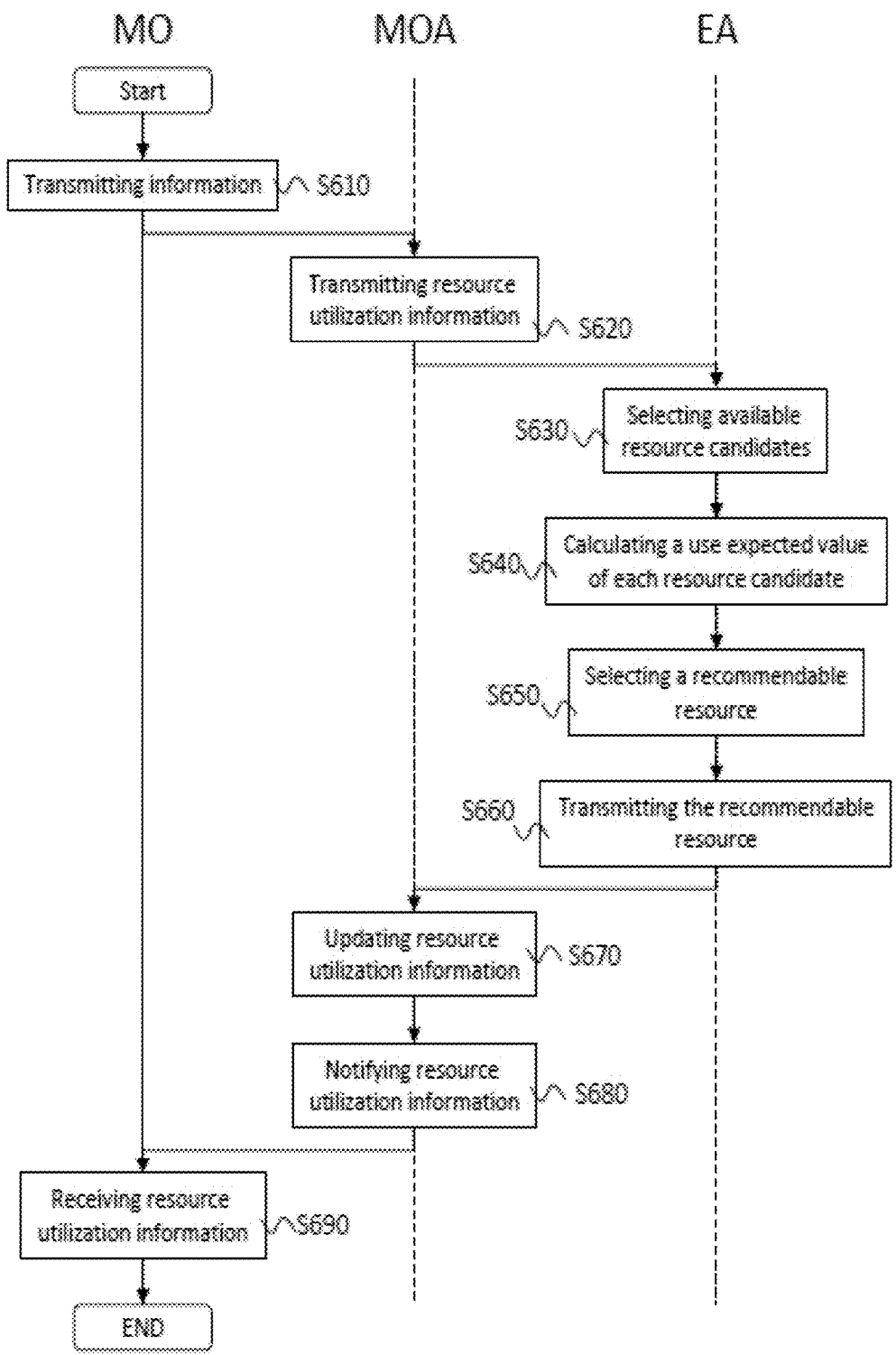
FIG. 6 shows an exemplary operational flow of the resource obtaining function and the resource recommendation function according to an embodiment of the present invention.

FIG. 6 shows an exemplary operational flow of resource obtaining function and resource recommendation function according to an embodiment of the present invention. The present embodiment describes an example in which the system 100 performs the operations from S610 to S690 shown in FIG. 6. In the example, the mobile object agent may perform the resource obtaining function, and the event agent may perform the resource recommendation function.

FIG. 6 shows one example of the operational flow of the system 100 shown in FIGS. 1-5, but the system 100 shown in FIGS. 1-5 is not limited to using this operational flow. Also, the operational flow in FIG. 6 may be performed by other systems.

First, at S610, a mobile object (which may be referred to as a "target mobile object" and described as "MO" in FIG. 6), such as the mobile object 10, may transmit information of the target mobile object to the mobile object agent managing the target mobile object (which may be referred to as "target mobile object agent" and described as "MOA" in FIG. 6). For example, the target mobile object may transmit a car probe data including information of at least one of a current location, a direction, and a speed of the target mobile object and the destination information of the target mobile object, to the target mobile object agent. In one embodiment, the destination information may include a destination address of the mobile object, which may be input to a car navigation system installed in the target mobile object.

At S620, the target mobile object agent may generate resource utilization information of the target mobile object based on the destination indicated in the destination information, and may transmit the resource utilization information to the event agent. In one embodiment, the target mobile object agent may generate the resource utilization information by specifying the destination in the destination information, as the resource in the resource utilization information. In one embodiment, the target mobile object agent may generate the resource utilization information by searching a database for a resource that has the same address as the destination indicated by the destination information, or, a resource that is located within a threshold distance from the destination.

In one embodiment, the target mobile object agent may generate the resource utilization information that specifies one or more routes as a resource. For example, the target mobile object agent may generate the resource utilization information by specifying, as the resource, one or more routes that have been scheduled for use in arriving at the destination.

The target mobile object agent may update the mobile object list to reflect the generated resource utilization information. Then the target mobile object agent may transmit the resource utilization information to the event agent managing an area where the target mobile object or the destination exists (which may be referred to as "target event agent" and described as "EA" in FIG. 6). The target mobile object agent may further transmit the speed and the current location of the target mobile object to the target event agent.

At S630, the target event agent may select available resource candidates for the target mobile object. In one embodiment, the target event agent may retrieve one or more resources (i) that are located within a threshold distance from the resource indicated in the resource utilization information (which may be referred to as "target resource") from all resources included in the resource list of the event agent, and/or (ii) that are the same type or alternative type of the target resource, as the available resource candidates. The retrieved resources may include the target resource itself.

For example, if the target resource is a specific restaurant, then the target event agent may select, as available resource candidates, one or more neighboring restaurants serving the same or similar food as the target resource. In this example, the target event agent may further select one or more parking lots existing within a threshold distance from the specific restaurant as the available resource candidates, so that the mobile object may be parked at the parking lot so that the passenger(s) can visit the restaurant. In another example, if the target resource is the route, then the target event agent may select one or more alternative routes that may be used for arriving at the destination.

At S640, the target event agent may calculate an expected use value of each of the resource candidates. The expected use value is used to determine an alternative resource to recommend to the target mobile object. The target event agent may calculate the expected use value based on a future state of use of the resource candidate that the target event agent may estimate based on the current state of use of the resource candidate received from a management apparatus, such as the management apparatus 300, and a predicted arrival time of the target mobile object at the resource candidate.

For example, if the resource candidate is a parking lot or a shop having a parking lot, the expected use value "T" may be estimated by the target event agent as shown below:

$$T=\{0: \text{ if } P>=1, (1-P) \times d: \text{ if } P<1\} \quad \text{formula (1)}$$

where the variable "P" is a future state of use of the resource candidate corresponding to a number of predicted available spaces in the future in the parking lot in this example. In the example of the parking space, the target event agent may calculate the future state of use of the resource candidate "P" based on the current state of the resource candidate such as one of a number of occupied and a number of available parking spaces of a parking lot, and a number of mobile objects arriving, a number of mobile objects leaving the parking lot in a period of time. The variable "d" corresponds to an average time interval of mobile objects departing from the resource candidate, The variable "P" may be calculated as shown below:

$$P=p-\text{Arrival}(a,t_a)+\text{Depart}(d,t_d)-N \quad \text{formula (2)}$$

where the variable "p" is a current state of use of the resource candidate, corresponding to a number of currently available parking spaces in the parking lot, and may be obtained from the management apparatus managing the resource candidate. The function Arrival "(a, $t_a$)" inputs a variable "a" which corresponds to an average time interval of mobile objects arriving at the resource candidate and a variable "$t_a$" which corresponds to a predicted arrival time of the target mobile object at the resource candidate, and outputs a number of mobile objects arriving at the resource candidate by the time "$t_a$" from the current time. The function "Depart(d, $t_d$)" inputs the variable "d" and the variable "$t_d$" and outputs a number of mobile objects leaving the resource candidate from the current time until the time $t_d$. The variable "N" is a number of other mobile objects to which the resource candidate is recommended, and of which the predicted arrival time is earlier than the target mobile object. The expected use value "T" may correspond to an expected waiting time for the resource candidate in the example.

In another example, if the resource candidate is one or more routes, then the expected use value "T" may be expected time necessary for passing through the routes. The target event agent may use a future density of mobile objects on the routes as a future state of use of the routes. The target event agent calculates the future state (e.g., future density) based on (i) a current number of mobile objects traveling on the resource candidate, (ii) a number of mobile objects flowing into the resource candidate, (iii) a number of mobile objects flowing out from the resource candidate, (iv) a relation expression between a density of mobile objects and an average speed of mobile objects, and (v) a predicted arrival time of the target mobile object at the route. The target event agent calculates the future density further based on at least one of a speed limit, an average speed, and a number of lanes of the resource candidate.

In one embodiment, the target event agent may obtain (i) the current number of mobile objects traveling on the resource candidate, (ii) the number of mobile objects flowing into the resource candidate, and (iii) the number of mobile objects flowing out from the resource candidate, which may be considered as a current state of use of the resource candidate, from the management apparatus managing the resource candidate. The target event agent may obtain (iv) the relation expression by learning from training data. The target event agent predicts an arrival time of the target mobile object at the resource candidate.

In the embodiment, the target event agent then calculates the future density of the route at the predicted arrival time of the target mobile object at the resource candidate, based on the (i)-(iii) information. The target event agent estimates the average speed of the target mobile object traveling through the resource candidate, based on the calculated density and (iv) the relation expression. The target event agent predicts time needed for the target mobile object to pass through the resource candidate as the expected use value "T", based on the average speed and length of the route of the resource candidate.

The target event agent may adjust the expected use value based on a preference of passengers of the target mobile object. In one embodiment, the target event agent may obtain information of a passenger from a passenger server, such as the passenger server 240 of FIG. 3. If the passenger (preferring broad routes) is expected to like the resource candidate (e.g., a broad route), then the event agent may increase the expected use value, and if the passenger is expected to dislike the resource (e.g., a narrow route), then the event agent may decrease the expected use value.

At S650, the target event agent may select a recommendable resource from the resource candidates. In one embodiment, the target event agent may select a resource that has the best expected use value "T" (e.g., the highest "T") among the resource candidates. In some cases, the target event agent may select the target resource itself as the recommended resource.

At S660, the target event agent may send a recommendation for alternative resource utilization to the target mobile object agent. In one embodiment, the target event agent may transmit the resource recommendation to the target mobile object agent.

At S670, the target mobile object agent may receive the resource recommendation from the target event agent, and update the resource utilization information with the recommended resource in the mobile object list. In other words, the updated resource utilization information is the recommendable resource. The target mobile object agent may also register the recommended resource in the mobile object list.

At S680, the target mobile object agent may notify the target mobile object of the updated resource utilization information. Thereby, the target mobile object recommends alternative resources for relaxing congestion of the target resource.

At S690, the target mobile object may receive the resource utilization information from the target mobile object agent. The target mobile object may update the destination of its navigation system with the resource of the resource utilization information, and notify its passenger(s) that the destination is updated. In an embodiment where the target mobile object is an autonomous or semi-autonomous vehicle, an update of the destination may control, or assist in the movement, of the target mobile object towards the resource. Alternatively, the target mobile object may recommend updating the destination of the navigation system with the resource of the resource utilization information.

As explained above, according to the operational flow of FIG. 6, the event server expects a future state of use of the resource at the predicted arrival timing of mobile objects, and sends a recommendation for using an alternative resource to at least one mobile object among the plurality of mobile objects. Thereby, the event server can avoid causing congestion of the resources.

FIG. 7 shows the mobile object list according to an embodiment of the present invention. As described in FIG. 7, the mobile object list may include at least IDs of the mobile objects, the current locations of mobile objects, the future locations of mobile objects, the resource utilization information of the mobile objects, and the recommended resource. As described, the recommended resource may or may not be the same as the resource utilization information.

FIG. 8 shows the resource list according to an embodiment of the present invention. As described in FIG. 8, the resource list may include at least IDs of the resources, types of the resources, locations of the resources, basic information of the resources, capacities of the resources, etc. For example, the record of resource identified as Re 0001 indicates that Re 0001 is a parking lot, has 30 available parking spaces for cars, requires a parking fee of 5$/hour, and 10 parking spaces of Re 0001 are currently occupied. The record of resource identified as Re 1000 indicates that Re 1000 is a route that has 3 lanes, its speed limit is 50 miles per hour, and its average speed is 45 miles per hour, Re 1000 has a capacity of 300 cars, 200 cars are currently travelling on Re 1000, 20 cars per minute are flowing into Re 1000, and 15 cars per minute are flowing out from Re 1000. The record of Re 1000 may indicate that the current density of Re 1000 is 200/300.

Figure 9:
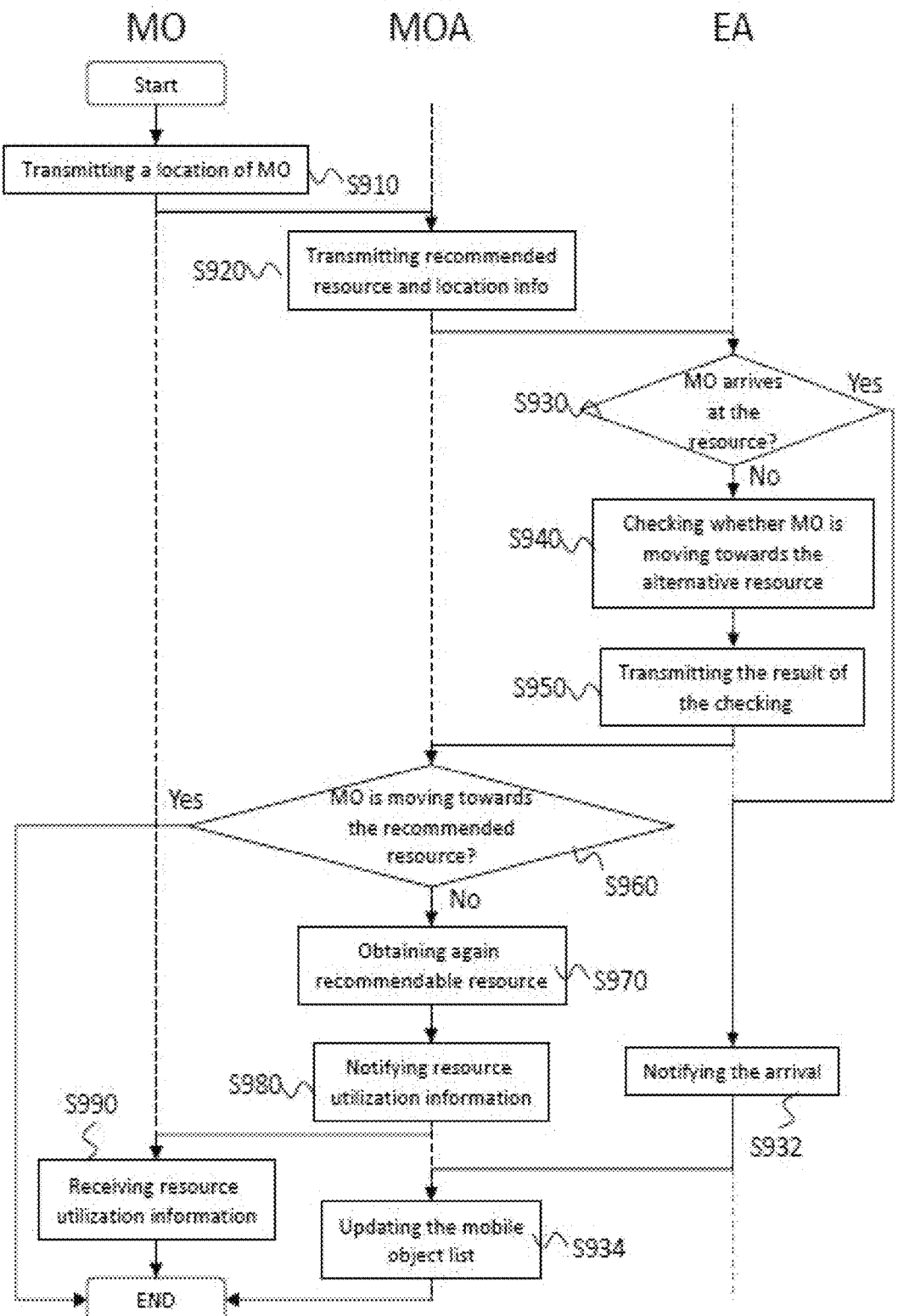
FIG. 9 shows an exemplary operational flow of the location reporting function and the route confirmation function according to an embodiment of the present invention.

FIG. 9 shows an exemplary operational flow of the location reporting function and the route confirmation function according to an embodiment of the present invention. The present embodiment describes an example in which a system, such as the system 100, performs the operations from S910 to S990, as shown in FIG. 9.

In the example, the mobile object agent performs the location reporting function, and the event agent performs the route confirmation function. The system may perform the operational flow of FIG. 9 in response to completion of the resource recommendation, such as in the flow of FIG. 6.

FIG. 9 shows one example of the operational flow of the system 100 shown in FIGS. 1-5, but the system 100 shown in FIGS. 1-5 is not limited to using this operational flow explained below. Also, the operational flow in FIG. 9 may be performed by other systems.

First, at S910, a mobile object (referred to as "target mobile object"), such as the mobile object 10, may transmit information of the target mobile object to the mobile object agent managing the target mobile object (referred to as "target mobile object agent"). The target mobile object may perform the process of S910 in the same manner as S610.

At S920, the target mobile object agent may transmit a recommended resource of the target mobile object, a current location of the target mobile object, and a near-future location of the target mobile object. In one embodiment, the target mobile object agent may obtain the current location of the target mobile object from the information received from the target mobile object, and the recommended resource of the target mobile object from the mobile object list. The target mobile object agent may estimate the near-future location of the target mobile object based on the current location, the speed, and the direction of the target mobile object. In one embodiment, the target mobile object agent may estimate the location of the target mobile object a few minutes after obtaining the current location of the target mobile object.

At S930, the target event agent may determine whether the target mobile object has arrived at the recommended resource. In one embodiment, the target event agent may determine whether the current location is the same as the location of the recommended resource, or whether the current location is within a threshold distance from the recommended resource. If the current location is the same as the location of the recommended resource, then the target event agent proceeds with S932, and if current location is not the same as the location of the recommended resource, then the target event agent proceeds with S940.

At S932, the target event agent may notify the target mobile object agent that the target mobile object has arrived at the recommended resource, and proceed with S934.

At S934, the target mobile object agent may update the mobile object list by adding information that the target mobile object has arrived at the recommended resource. The target mobile object may end the operation of FIG. 9.

At S940, the target event agent may check whether the target mobile object is moving towards the alternative resource, rather than the recommended resource. In one embodiment, the target event agent may determine whether the near-future location of the target mobile object is closer to the recommended resource than the current location of the target mobile object. In one embodiment, the target event agent may estimate one or more appropriate routes from the current location to the recommended resource, and determine whether the near-future location of the target mobile object is on at least one of the appropriate routes.

At S950, the target event agent may transmit the result of the checking of S940 to the target mobile object agent.

At S960, the target mobile object agent may determine whether the target mobile object is moving towards the recommended resource according to the result of checking of S940 received from the target event agent. If the target mobile object agent determines that the target mobile object is moving towards the recommended resource, then the target mobile object agent may end the operation flow of FIG. 9 or go back to the process of S910. If the target mobile object agent determines that the target mobile object is not moving towards the recommended resource, then the target mobile object agent may proceed with S970.

At S970, the target mobile object agent may obtain a recommendable resource from the target event agent. The target mobile object agent and the target event agent may perform the same processes as S620-S670 in FIG. 6 at S970. Here, the target event agent may select a recommendable resource that is different from the recommended resource of the target mobile object to present to the target mobile object as an alternative resource.

At S980, the target mobile object agent may notify the target mobile object of the updated resource utilization information. Thereby, the target mobile object recommends an alternative resource for relaxing congestion of the target resource.

At S990, the target mobile object may receive the resource utilization information from the target mobile object agent. The target mobile object may update its destination with the resource of the resource utilization information, and notify its passenger(s) that the destination has been updated. In an embodiment where the target mobile object is an autonomous or semi-autonomous vehicle, an update of the destination may control, or assist in the movement, of the target mobile object towards the resource. Alternatively, the target mobile object may recommend updating the destination with the resource of the resource utilization information. The system may end the process of FIG. 9 or go back to S910.

According to processes S910-S990, if the mobile object is not moving towards the recommended resource, the system can recommend another alternative resource for relaxing congestion.

Figure 10:
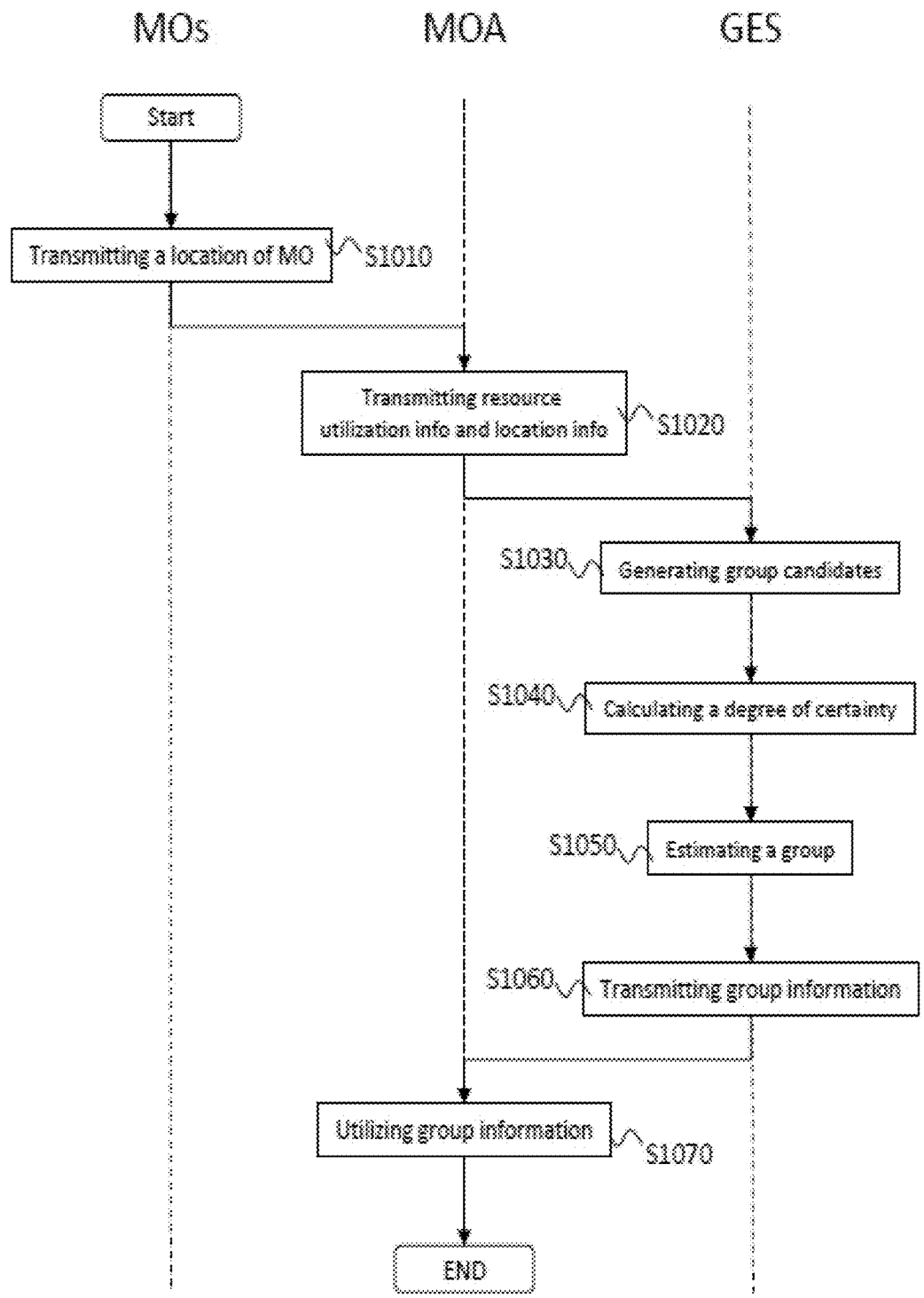
FIG. 10 shows an exemplary operational flow of the group estimation function according to an embodiment of the present invention.

FIG. 10 shows an exemplary operational flow of the group estimation function according to an embodiment of the present invention. The present embodiment describes an example in which the system 100 performs operations from S1010 to S1070, shown in FIG. 10. In the example, a group estimation server, such as the group estimation server 222, performs a group estimation function.

At S1010, a plurality of mobile objects, such as the mobile objects 10, may transmit information of a plurality of the mobile objects (e.g., car probe data, including a current location and a direction of each mobile object) to the mobile object agents that manage the plurality of mobile objects (which may be referred to as "target mobile object agents").

At S1020, the target mobile object agents transmit the current location information of the target mobile objects, the directions of the target mobile objects, and the resource utilization information of the target mobile objects to the group estimation server (described as "GES" in FIG. 10) managing the plurality of the mobile objects.

At S1030, the group estimation server may generate a group candidate for at least two mobile objects based on a location and a direction of each of at least two mobile objects among the plurality of mobile objects. In one embodiment, the group estimation server may collect at least two mobile objects that are located on the same route within a threshold distance and are moving towards the same direction, and regard the at least two mobile objects as a group candidate.

At S1040, the group estimation server may calculate a degree of certainty for each group candidate. In one embodiment, the group estimation server may increase the degree of certainty of a group candidate if the at least two mobile objects in the group candidate have been regarded as the candidate group for a threshold duration. In one embodiment, the group estimation server may decrease the degree of certainty of a group candidate if one mobile object of the at least two mobile objects in the group becomes distant by a threshold distance from the other mobile objects in the group candidate.

The group estimation server may increase the degree of certainty if resources indicated in the resource utilization information of the at least two mobile objects in the group candidate are the same or located within a threshold distance, or if the at least two mobile objects in the group candidate are considered to be traveling on the same route for a threshold distance or threshold duration based on the resource utilization information.

At S1050, the group estimation server may estimate a group of mobile objects among the plurality of mobile objects. In one embodiment, the group estimation server may determine that the group candidate constitutes a group if the degree of certainty is more than a threshold for more than a predetermined duration. In one embodiment, the group estimation server may determine that the group candidate no longer constitutes a group if the degree of certainty becomes not more than the threshold.

At S1060, the group estimation server may transmit information of groups estimated at S1050 to the target mobile object agents. In one embodiment, the group estimation server may transmit information indicating correspondence between each mobile object and each of the estimated groups to each target mobile object that manages a mobile object belonging to one of the groups.

At S1070, the target mobile object agents may utilize the information of groups. In one embodiment, each of the target mobile object agents may transmit the information of the group to the target event agent at S620 of FIG. 6 with resource utilization information.

Then, the event agent may perform S640 of FIG. 6 further based on the information of the group. In one embodiment, the expected use value "T" may be estimated by following formula (1)' instead of the formula (1).

$$T=\{0: \text{if } P>=g, (g-P)\times d: \text{if } P<g\} \quad \text{formula (1)'}$$

where a variable "g" is a number of mobile objects included in the group of the target mobile object.

Thereby the target mobile objects in a group can receive recommendations of resource to accommodate a group of mobile objects.

Figure 11:
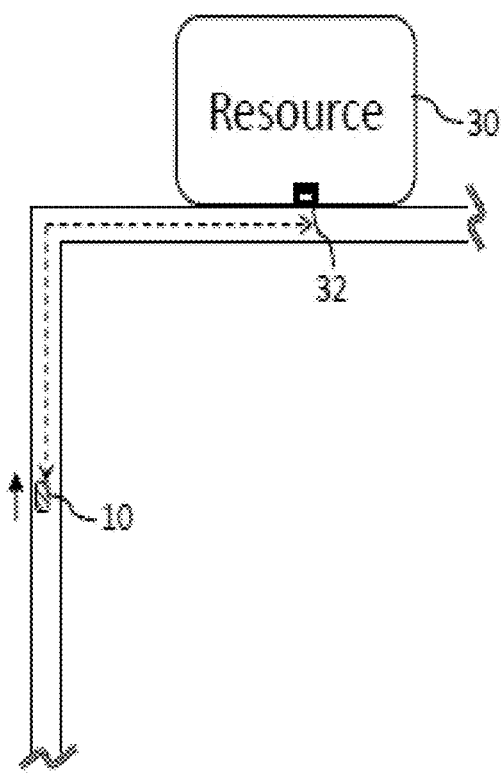
FIG. 11 shows the waiting line estimation function according to an embodiment of the present invention.

FIG. 11 shows the waiting line estimation function according to an embodiment of the present invention. In one embodiment, the target event agent may calculate the current state of use of the resource "p" to reflect a waiting line of mobile objects at S640 of FIG. 6. A dashed line 32 in FIG. 11 indicates a waiting line of a plurality of mobile objects that is waiting to use a resource 30, and the mobile object 10 is the last car in the waiting line 32.

In the embodiment, the target event agent may calculate the state of use of the resource based on a distance to the resource from a mobile object approaching the resource at a speed less than a threshold at S640 or prior to the operations of FIG. 6. For example, if a number of currently available parking spaces in the parking lot is 0, then the target event agent may search for the most remote mobile object that is located within a predetermined area near the resource candidate and that is approaching the resource candidate at a speed less than a threshold.

Then, the target event agent may divide the distance (e.g., a length of the dashed line 32 in FIG. 11) between the resource candidate (e.g., the resource 30 in FIG. 11) and the most remote mobile object (e.g., the mobile object 10 in FIG. 11) by a length (e.g., length of a distance of an average car length and an average space between cars). The target event agent may set a value obtained by the division as "p". For example, if the distance is 100 m and the length is 10 m, then the target event agent sets "p" to "−10". Thereby, the target event agent may reflect a waiting line in the state of use of the resource candidate.

The target event agent may calculate the expected use value based on a traffic accident at S640 or prior to the operation of FIG. 6. In one embodiment, if the resource is a route, the target event agent may predict time needed for the target mobile object to pass through the resource candidate plus a statistical time for handling of an accident as the expected use value "T".

In addition, if the target event agent obtains information of a schedule of completion time for handling of the accident, then the target event agent may estimate the expected use value by using the obtained schedule.

In the embodiments explained above, a capacity of resources (e.g., the maximum number of parking spaces of a parking lot and a number of lanes of a route) is fixed. However, in some embodiments, the event server may change the capacity of resources. In one embodiment, the target event agent may send a request for increasing a capacity of the resource to a management apparatus, such as the management apparatus 300. In one embodiment, the target event agent may send a request for increasing a capacity of a parking lot by opening a reserved parking area, or of a highway by changing the center line of a road to assign more lanes to one direction.

In one embodiment, the target event agent may send the request at S650 of FIG. 6 if the target event agent determines that the expected use value of the recommendable resource selected at S650 is less than a threshold, and that the recommendable resource receives such request.

Figure 12:
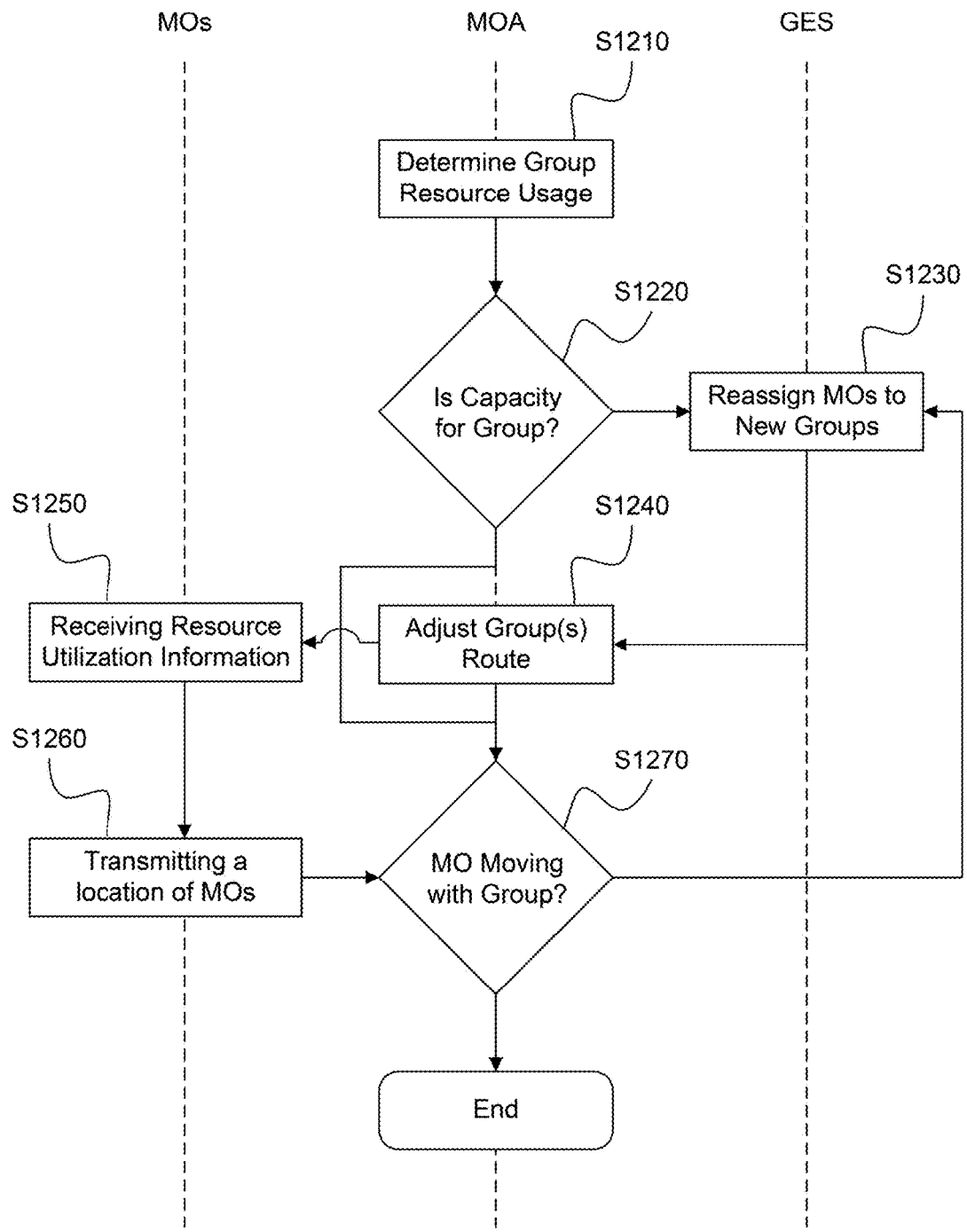
FIG. 12 shows an exemplary operation flow of resource allocation function according to an embodiment of the present invention.

FIG. 12 shows an embodiment whereby the methods described in FIG. 6, FIG. 9 and FIG. 10 work in conjunction to allocate resources amongst a group of mobile objects.

At S1210, the target mobile object agents may utilize the information of groups. In one embodiment, each of the target mobile object agents may transmit the information of the group to the target event agent at S620 of FIG. 6 with resource utilization information.

Then, the event agent may perform S640 of FIG. 6 further based on the information of the group. In one embodiment, the expected use value "T" may be estimated by following formula (1)' instead of the formula (1).

$$T = \{0: \text{if } P >= g, (g-P) \times d: \text{if } P < g\} \quad \text{formula (1)'}$$

where a variable "g" is a number of mobile objects included in the group of the target mobile object. Thereby the target mobile objects in a group can receive recommendations of resource to accommodate a group of mobile objects, or alternatively may determine an amount of resource utilization required by the group of mobile objects.

In an example embodiment, the event agent may send back one or more recommendations for the group of mobile objects.

At S1220, the target mobile object agents may determine if any of the recommendations received for the group of mobile objects has a sufficient capacity to accommodate every object in the group of mobile objects. In one embodiment, the determination may be made based on the number of mobile objects within the group, and whether there are a sufficient number of resources to accommodate the mobile object number. However, in other embodiments, the determination may take into account total weight of the mobile objects, height of each of the mobile objects, an area encompassed by each of the mobile objects, driving or operating restrictions of each of the mobile objects, or any other parameters that may affect usage of the resource. If the current recommendation has capacity for the group, then the mobile object agent proceeds with S1260, and if the current recommendation does not have capacity for the group, then the target event agent proceeds with S1230.

At S1230, the group estimation server may generate group candidates based on the parameters of the one or more recommendations from the event agent. In determining the new groups for the mobile objects, the group estimation server may allocate each mobile object to one of a plurality of resources that may be used to accommodate a portion of the original group. The allocation may be done by assigning mobile objects to separate groups to minimize a performance parameter (e.g. distance traveled, time traveled) for the entire group, by increasing the degree of certainty used to calculate the original groups (S1040), or any other suitable mechanism. New group determination and assignment may be aided with the group estimation system detailed in FIG. 10, and steps S1010-S1070. Additionally, mobile objects may be split from any group assignment, and may be handled individually.

At S1240, the target mobile object agent may obtain a recommendable resource from the target event agent. The target mobile object agent and the target event agent may perform the same processes as S620-S670 in FIG. 6 at S1240. Here, the target event agent may select multiple recommendable resources for the multiple groups, where each resource may be tailored to the specific group. The target mobile object agent may notify the target mobile object of the updated resource utilization information. Thereby, the target mobile object recommendation relaxes congestion by splitting and reallocating groups.

At S1250, the target mobile object may receive the resource utilization information from the target mobile object agent. The target mobile object may update its destination with the resource of the resource utilization information, and notify its passenger(s) that the destination has been updated. In an embodiment where the target mobile object is an autonomous or semi-autonomous vehicle, an update of the destination may control, or assist in the movement, of the target mobile object towards the resource. Alternatively, the target mobile object may recommend updating the destination with the resource of the resource utilization information.

At S1260, a mobile object (which may be referred to as a "target mobile object" and described as "MO" in FIG. 12), such as the mobile object 10, may transmit information of the target mobile object to the mobile object agent managing the target mobile object (which may be referred to as "target mobile object agent" and described as "MOA" in FIG. 12). For example, the target mobile object may transmit a car probe data including information of at least one of a current location, a direction, and a speed of the target mobile object and the destination information of the target mobile object, to the target mobile object agent. In one embodiment, the destination information may include a destination address of the mobile object, which may be input to a car navigation system installed in the target mobile object.

At S1270, the target mobile object agent may determine whether a mobile object is moving with the group of mobile objects. The target mobile object agent and the target event agent may perform the same processes as S1030-S1050 in FIG. 10 at S1240 to determine whether the mobile object is still moving with the group of objects it was assigned to. If the target mobile objects are moving with their assigned groups, then the system may end the process of FIG. 12 or go back to S1210, and if the target mobile objects are not moving with their assigned groups, then the target event agent returns to S1230.

Figure 13:
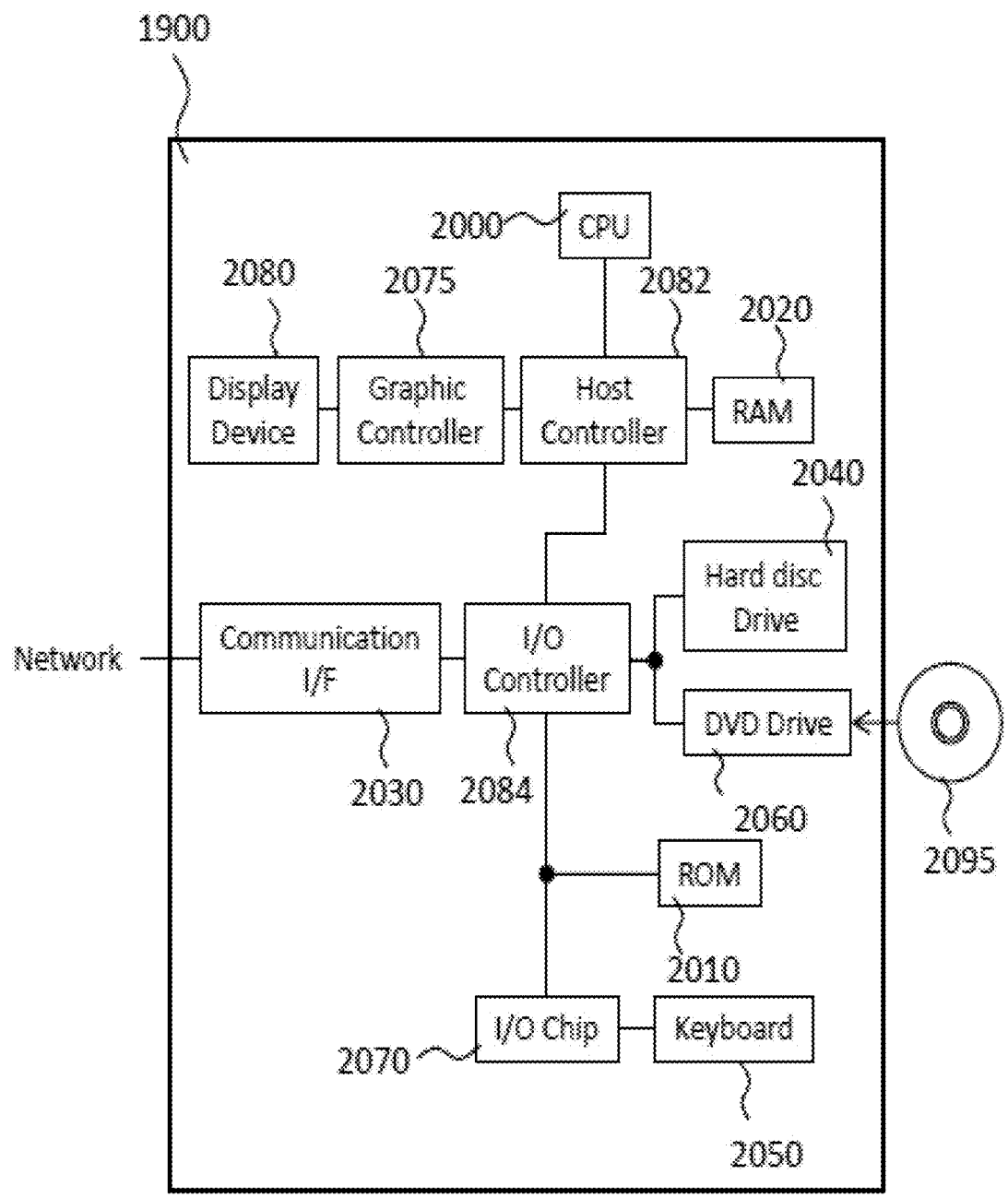
FIG. 13 shows a computer, according to an embodiment of the present invention.

FIG. 13 shows an exemplary configuration of a computer 1900 according to an embodiment of the present invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the region manager, the subsystems 200 and other element (s) in the system 100 of FIG. 3 includes for example a determining module. The program or module acts on the CPU 2000, to cause the computer 1900 to function as a section, component, element such as determining section 146.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a system, a method, and a program for the management of mobile objects and resources.

What is claimed is:

1. A computer system for managing mobile objects, the computer system comprising:
 a processor, a computer-readable tangible storage device, and program instructions stored on the storage device for execution by the processor, the program instructions comprising:
  receiving mobile object information from a plurality of mobile objects in a geographic space, wherein the information comprises location and direction of movement of each of the plurality of mobile objects;
  determining utilization of a geographic resource in the geographic space based on the mobile object information from the plurality of mobile objects;
  determining a first mobile object from the plurality of mobile objects will use the geographic resource based first mobile object information received from the first mobile object;
  determining an alternative resource for the first mobile object based on a first mobile object destination and the first mobile object information, wherein the alternative resource is a replacement for the geographic resource;
  transmitting an alternative route for the alternative resource to the first mobile object;
  determining that a current route of the first mobile object does not match the alternative route;
  based on determining the current route and the alternative route do not match, determining a second mobile object as an alternative mobile object, wherein the second mobile object is determined based on:
   a route of the second mobile object is the same as the route of the first mobile object;
   a distance between the first mobile object and the second mobile object is below a threshold distance;
   a direction of movement of the second mobile object is the same as the direction of the first mobile object; and
   controlling the second mobile object to use the alternative route for the alternative resource.

2. The system of claim 1, wherein the program instructions to determine the alternative resource for the first mobile object based on the first mobile object destination and the first mobile object information is performed based on determining a current state of utilization of the resource is above a threshold value.

3. The system of claim 2 further comprising:
 program instructions to calculate a future state of utilization of the resource based on the current state of use of the resource; and
 program instructions to determine the alternative resource for the first mobile object based on the first mobile object destination and the first mobile object information is performed further based on determining the future state of use of the resource is above a threshold value.

4. The system of claim 2, wherein determining the current state of utilization of the resource is based on a distance to the resource from the first mobile object at a speed less than a threshold speed.

5. The system of claim 2, wherein determining the current state of utilization of the resource is based on at least one of a speed limit, an average speed, and a number of lanes of a route.

6. The system of claim 2, wherein determining the current state of utilization of the resource is based on at least one of a speed limit, an average speed, and a number of lanes of a route.

7. The system of claim 1 further comprising program instructions to increase a capacity of utilization of the resource.

8. The system of claim 1 further comprising:
 determining a plurality of mobile objects matching the first mobile object; and
 concurrently managing the plurality of mobile objects with the first mobile object.

9. A computer-implemented method for managing mobile objects, the method comprising:
 receiving mobile object information from a plurality of mobile objects in a geographic space, wherein the information comprises location and direction of movement of each of the plurality of mobile objects;

determining utilization of a geographic resource in the geographic space based on the mobile object information from the plurality of mobile objects;

determining a first mobile object from the plurality of mobile objects will use the geographic resource based first mobile object information received from the first mobile object;

determining an alternative resource for the first mobile object based on a first mobile object destination and the first mobile object information, wherein the alternative resource is a replacement for the geographic resource;

transmitting an alternative route for the alternative resource to the first mobile object;

determining that a current route of the first mobile object does not match the alternative route;

based on determining the current route and the alternative route do not match, determining a second mobile object as an alternative mobile object, wherein the second mobile object is determined based on:
- a route of the second mobile object is the same as the route of the first mobile object;
- a distance between the first mobile object and the second mobile object is below a threshold distance;
- a direction of movement of the second mobile object is the same as the direction of the first mobile object; and controlling the second mobile object to use the alternative route for the alternative resource.

10. The method of claim 9, wherein the determining the alternative resource for the first mobile object based on the first mobile object destination and the first mobile object information is performed based on determining a current state of utilization of the resource is above a threshold value.

11. The method of claim 10 further comprising:
calculating a future state of utilization of the resource based on the current state of use of the resource; and
determining the alternative resource for the first mobile object based on the first mobile object destination and the first mobile object information is performed further based on determining the future state of use of the resource is above a threshold value.

12. The method of claim 10, wherein determining the current state of utilization of the resource is based on a distance to the resource from the first mobile object at a speed less than a threshold speed.

13. The method of claim 10, wherein determining the current state of utilization of the resource is based on at least one of a speed limit, an average speed, and a number of lanes of a route.

14. The method of claim 10, wherein determining the current state of utilization of the resource is based on at least one of a speed limit, an average speed, and a number of lanes of a route.

15. A computer program product for managing mobile objects, the computer program product comprising:
one or more computer-readable storage devices and program instructions stored on at least one of the one or more computer-readable storage devices, the program instructions comprising:
receiving mobile object information from a plurality of mobile objects in a geographic space, wherein the information comprises location and direction of movement of each of the plurality of mobile objects;
determining utilization of a geographic resource in the geographic space based on the mobile object information from the plurality of mobile objects;
determining a first mobile object from the plurality of mobile objects will use the geographic resource based first mobile object information received from the first mobile object;
determining an alternative resource for the first mobile object based on a first mobile object destination and the first mobile object information, wherein the alternative resource is a replacement for the geographic resource;
transmitting an alternative route for the alternative resource to the first mobile object;
determining that a current route of the first mobile object does not match the alternative route;
based on determining the current route and the alternative route do not match, determining a second mobile object as an alternative mobile object, wherein the second mobile object is determined based on:
- a route of the second mobile object is the same as the route of the first mobile object;
- a distance between the first mobile object and the second mobile object is below a threshold distance;
- a direction of movement of the second mobile object is the same as the direction of the first mobile object; and controlling the second mobile object to use the alternative route for the alternative resource.

16. The computer program product of claim 15, wherein the program instructions to determine the alternative resource for the first mobile object based on the first mobile object destination and the first mobile object information is performed based on determining a current state of utilization of the resource is above a threshold value.

17. The computer program product of claim 16 further comprising:
program instructions to calculate a future state of utilization of the resource based on the current state of use of the resource; and
program instructions to determine the alternative resource for the first mobile object based on the first mobile object destination and the first mobile object information is performed further based on determining the future state of use of the resource is above a threshold value.

18. The computer program product of claim 16, wherein determining the current state of utilization of the resource is based on a distance to the resource from the first mobile object at a speed less than a threshold speed.

19. The computer program product of claim 16, wherein determining the current state of utilization of the resource is based on at least one of a speed limit, an average speed, and a number of lanes of a route.

20. The computer program product of claim 16, wherein determining the current state of utilization of the resource is based on at least one of a speed limit, an average speed, and a number of lanes of a route.

* * * * *